(12) United States Patent
Kasuga et al.

(10) Patent No.: US 10,214,070 B2
(45) Date of Patent: Feb. 26, 2019

(54) VEHICLE HEIGHT ADJUSTMENT DEVICE

(71) Applicant: Showa Corporation, Gyoda-shi (JP)

(72) Inventors: Takahiro Kasuga, Haga-gun (JP); Takahiro Koresawa, Haga-gun (JP); Masayoshi Ikeda, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/468,777

(22) Filed: Mar. 24, 2017

(65) Prior Publication Data

US 2017/0274722 A1  Sep. 28, 2017

(30) Foreign Application Priority Data

Mar. 28, 2016 (JP) ................................. 2016-064728

(51) Int. Cl.

| | |
|---|---|
| *B62K 25/04* | (2006.01) |
| *B62K 25/08* | (2006.01) |
| *B60G 17/016* | (2006.01) |
| *B60G 17/019* | (2006.01) |
| *B60G 17/0185* | (2006.01) |

(52) U.S. Cl.
CPC ....... *B60G 17/0185* (2013.01); *B60G 17/016* (2013.01); *B60G 17/019* (2013.01); *B62K 25/04* (2013.01); *B62K 25/08* (2013.01); *B60G 2300/12* (2013.01); *B60G 2400/204* (2013.01); *B60G 2400/25* (2013.01); *B60G 2500/30* (2013.01); *B60G 2600/08* (2013.01); *B62K 2025/045* (2013.01); *B62K 2025/048* (2013.01)

(58) Field of Classification Search
CPC .............. B60G 17/0185; B60G 17/019; B60G 17/016; B60G 2500/30; B60G 2400/25; B60G 2400/204; B60G 2600/08; B60G 2300/12; B62K 2025/045; B62K 2025/048
See application file for complete search history.

(56) References Cited

U.S. PATENT DOCUMENTS

| | | | | |
|---|---|---|---|---|
| 4,700,303 A | * | 10/1987 | Tokuyama | ......... B60G 17/0185 280/6.157 |
| 8,684,366 B2 | * | 4/2014 | Murakami | ........... B60G 17/021 280/5.514 |
| 2007/0129865 A1 | * | 6/2007 | Kim | ................... B60G 17/0185 701/37 |

(Continued)

FOREIGN PATENT DOCUMENTS

| | | |
|---|---|---|
| JP | 08-22680 A | 3/1996 |
| JP | 2004-34891 | * 2/2004 |

*Primary Examiner* — Michael J Zanelli
(74) *Attorney, Agent, or Firm* — Leason Ellis LLP

(57) ABSTRACT

A vehicle height adjustment device includes a changer, a vehicle height controller, and a malfunction detector. The changer is configured to change a relative position of a body of a vehicle relative to an axle of a wheel of the vehicle. The vehicle height controller is configured to change the relative position based on a detection value detected by a detector configured to detect the relative position so as to control a vehicle height, which is a height of the body. The malfunction detector is configured to detect a malfunction in at least one of the changer and the detector, the malfunction causing the vehicle height controller to continue to control the vehicle height to increase.

13 Claims, 16 Drawing Sheets

(56) References Cited

U.S. PATENT DOCUMENTS

| | | | |
|---|---|---|---|
| 2014/0291943 A1* | 10/2014 | Murakami | B60G 17/016 |
| | | | 280/5.514 |
| 2015/0102921 A1* | 4/2015 | Kim | B60G 17/0185 |
| | | | 340/450 |
| 2016/0272274 A1* | 9/2016 | Murakami | B62K 25/08 |
| 2017/0021688 A1* | 1/2017 | Murakami | B60G 17/0155 |

* cited by examiner

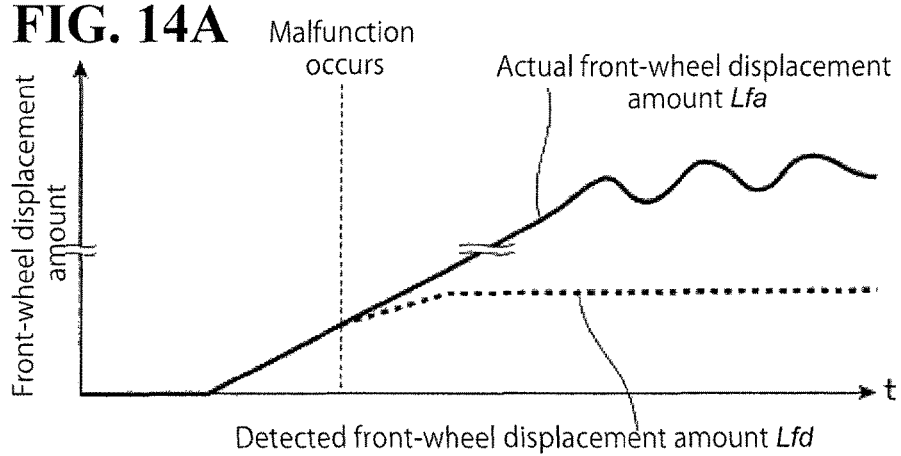
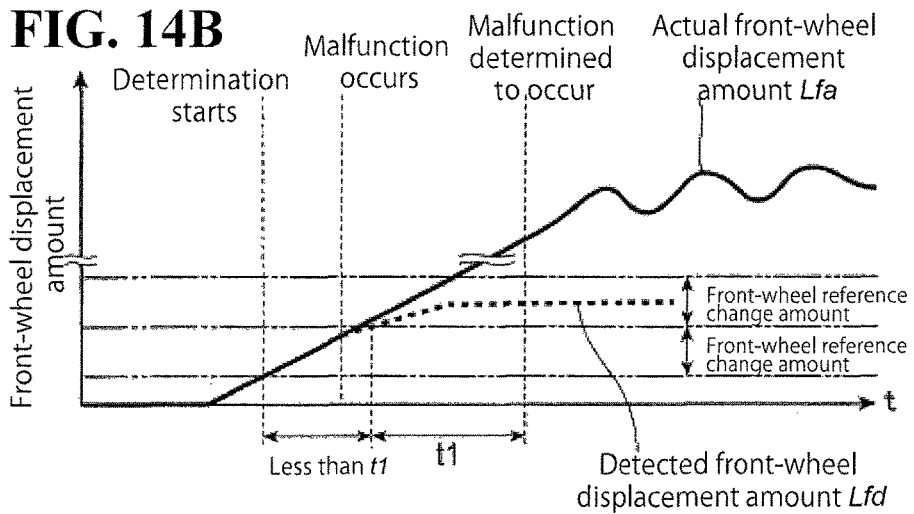
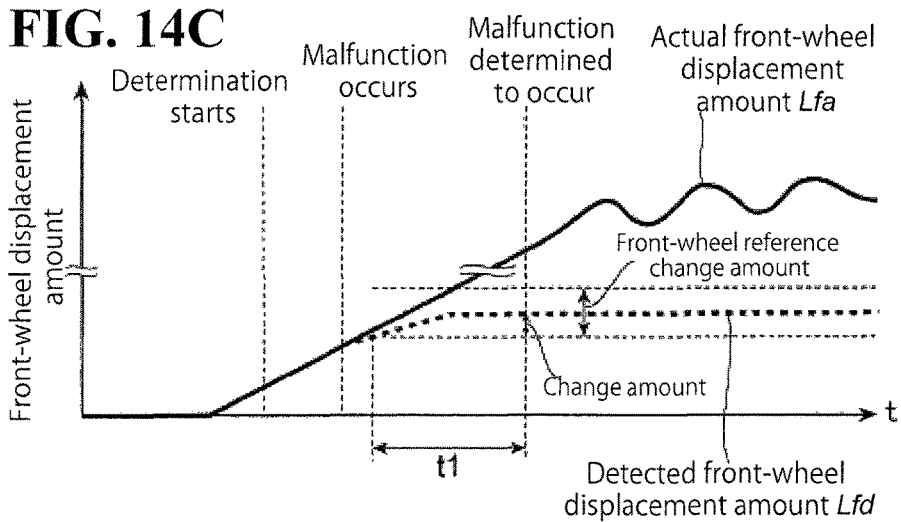

VEHICLE HEIGHT ADJUSTMENT DEVICE

CROSS-REFERENCE TO RELATED APPLICATIONS

The present application claims priority under 35 U.S.C. § 119 to Japanese Patent Application No. 2016-064728, filed Mar. 28, 2016. The contents of this application are incorporated herein by reference in their entirety.

BACKGROUND

Field

The present disclosure relates to a vehicle height adjustment device.

Background

Japanese Examined Patent Publication No. 8-22680 discloses a vehicle height adjustment device that increases the height of a motorcycle during travel and that decreases the height of the motorcycle during halt in order to facilitate a rider's or a passenger's getting on and off the motorcycle.

The vehicle height adjustment device automatically changes the height of the motorcycle in response to its speed of travel. Specifically, the vehicle height adjustment device automatically increases the height of the motorcycle when its speed reaches a set speed, and automatically decreases the height of the motorcycle when its speed changes to or below a set speed. In the adjustment of the height of the motorcycle, an electromagnetic actuator is driven into operation.

SUMMARY

According to one aspect of the present disclosure, a vehicle height adjustment device includes a changer, a vehicle height controller, and a malfunction detector. The changer is configured to change a relative position of a body of a vehicle relative to an axle of a wheel of the vehicle. The vehicle height controller is configured to change the relative position based on a detection value detected by a detector configured to detect the relative position so as to control a vehicle height, which is a height of the body. The malfunction detector is configured to detect a malfunction in at least one of the changer and the detector, the malfunction causing the vehicle height controller to continue to control the vehicle height to increase.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 14A is a time chart illustrating a trouble when a malfunction that causes continuation of control to increase a vehicle height occurs;

FIG. 14B is a time chart illustrating how a malfunction detector according to this embodiment controls;

FIG. 14C is a time chart illustrating another example of how the malfunction detector according to this embodiment controls;

DESCRIPTION OF THE EMBODIMENTS

Figure 1:
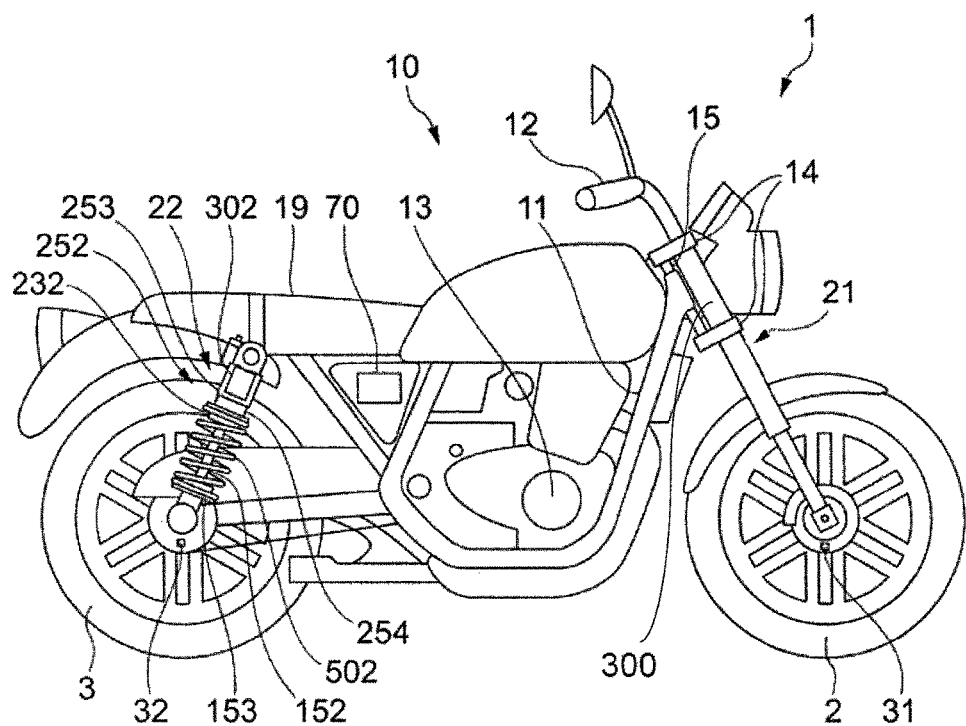
FIG. 1 illustrates a schematic configuration of a motorcycle according to an embodiment.

The embodiments will now be described with reference to the accompanying drawings, wherein like reference numerals designate corresponding or identical elements throughout the various drawings.

FIG. 1 illustrates a schematic configuration of a motorcycle 1 as an example of a vehicle according to this embodiment.

The motorcycle 1 includes a front wheel 2, a rear wheel 3, and a body 10. The front wheel 2 is a wheel on the front side of the motorcycle 1. The rear wheel 3 is a wheel on the rear side of the motorcycle 1. The body 10 includes elements such as a frame 11, a handle 12, an engine 13, and a seat 19. The frame 11 defines the framework of the motorcycle 1.

The motorcycle 1 includes two front forks 21. One of the front forks 21 is on the right side of the front wheel 2, and the other one of the front forks 21 is on the left side of the front wheel 2. The front forks 21 are examples of a suspension device that couples the front wheel 2 and the body 10 to each other. The motorcycle 1 includes two rear suspensions 22. One of the rear suspensions 22 is on the right side of the rear wheel 3, and the other one of the rear suspensions 22 is on the left side of the rear wheel 3. The rear suspensions 22 couple the rear wheel 3 and the body 10 to each other. FIG. 1 illustrates only the front fork 21 and the rear suspension 22 that are on the right side of the motorcycle 1. The front fork 21 and the rear suspension 22 are an example of the changer to change the position of the body 10 relative to the axle of the front wheel 2 and the position of the body 10 relative to the axle of the rear wheel 3.

The motorcycle 1 includes two brackets 14 and a shaft 15. The shaft 15 is disposed between the two brackets 14. The two brackets 14 respectively hold the front fork 21 on the right side of the front wheel 2 and the front fork 21 on the left side of the front wheel 2. The shaft 15 is rotatably supported by the frame 11.

The motorcycle 1 includes a controller 70. The controller 70 controls the height of the motorcycle 1 by controlling a front-wheel passage switch unit 300, described later, of each front fork 21 and a rear-wheel passage switch unit 302, described later, of each rear suspension 22.

The motorcycle 1 also includes a front-wheel rotation detection sensor 31 and a rear-wheel rotation detection sensor 32. The front-wheel rotation detection sensor 31 detects the rotation angle of the front wheel 2. The rear-wheel rotation detection sensor 32 detects the rotation angle of the rear wheel 3.

Configuration of Front Fork 21

Each front fork 21 will be described in detail below.

Figure 2:
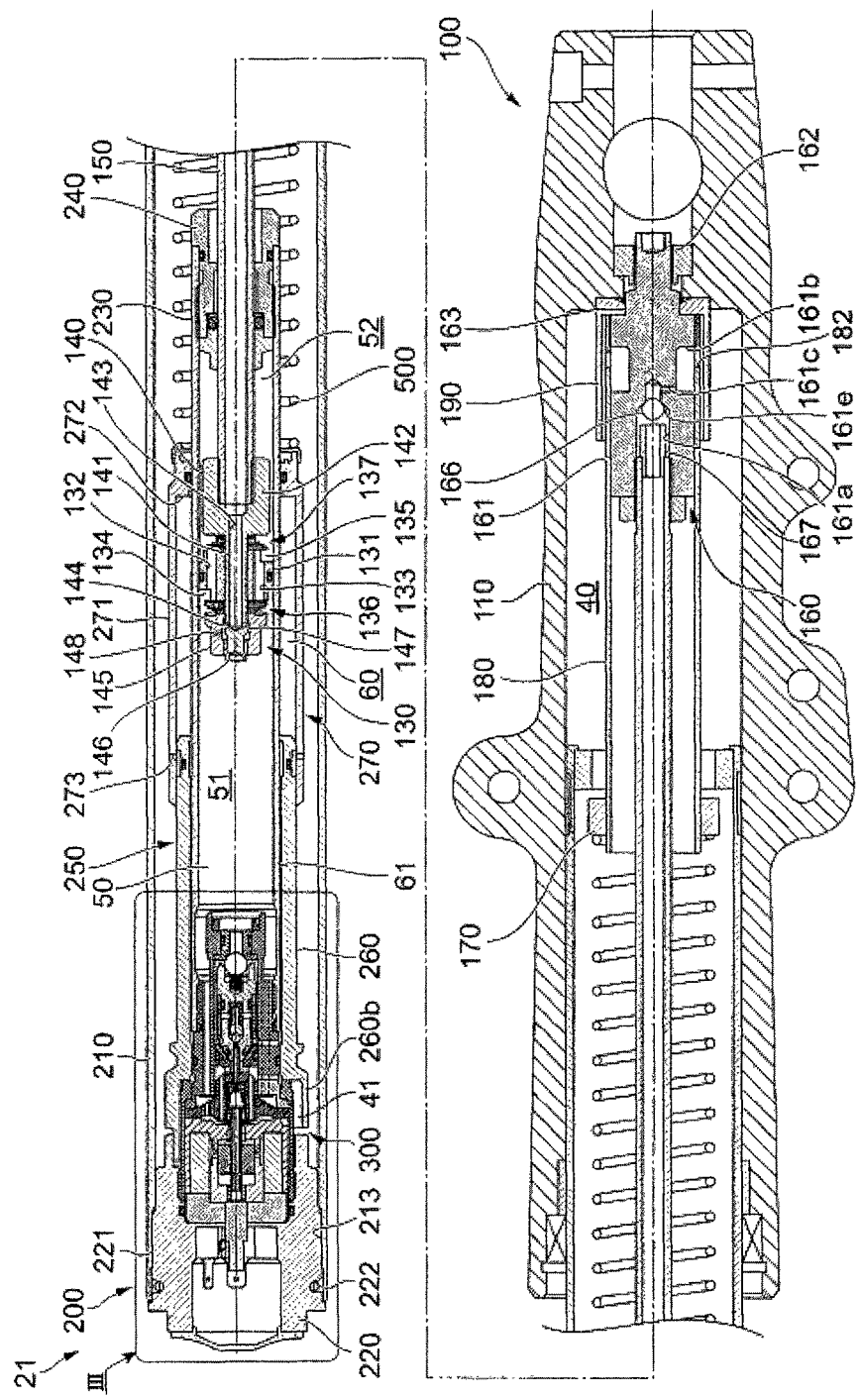
FIG. 2 is a cross-sectional view of a front fork according to the embodiment.

FIG. 2 is a cross-sectional view of the front fork 21 according to this embodiment.

The front fork 21 according to this embodiment is what is called an upright front fork that is disposed between the body 10 and the front wheel 2 of the motorcycle 1 so as to support the front wheel 2. The upright front fork 21 includes an outer member 110 (detailed later) and an inner tube 210 (detailed later). The outer member 110 is disposed on the side of the front wheel 2, and the inner tube 210 is disposed on the side of the body 10.

The front fork 21 includes an axle side unit 100 and a body side unit 200. The axle side unit 100 includes the outer member 110 and is mounted on the axle of the front wheel 2. The body side unit 200 includes the inner tube 210 and is mounted on the body 10. The front fork 21 also includes a front-wheel spring 500. The front-wheel spring 500 is disposed between the axle side unit 100 and the body side unit 200 to absorb vibrations transmitted to the front wheel 2 caused by the roughness of a ground surface.

The outer member 110 and the inner tube 210 are coaxial, hollow cylindrical members. A direction of the center line (that is, an axial direction) of each cylinder will be hereinafter occasionally referred to as "vertical direction". In this case, the body 10 side will occasionally be referred to the upper side, and the front wheel 2 side will occasionally be referred to as the lower side. By moving the axle side unit 100 and the body side unit 200 relative to each other in the vertical direction (axial direction), the front fork 21 absorbs vibrations caused by the roughness of the ground surface while supporting the front wheel 2.

Configuration of Axle Side Unit 100

The axle side unit 100 includes the outer member 110, an attenuation force generation unit 130, a rod 150, and a rod holding member 160. The outer member 110 is mounted on the axle of the front wheel 2. The attenuation force generation unit 130 generates attenuation force utilizing viscous resistance of oil. The rod 150 holds the attenuation force generation unit 130. The rod holding member 160 holds the lower-side end of the rod 150.

Configuration of Attenuation Force Generation Unit 130

The attenuation force generation unit 130 includes a piston 131, an upper-end side valve 136, and a lower-end side valve 137. The piston 131 defines an operating oil chamber 50, which is formed in the space inside a cylinder 230, described later. The upper-end side valve 136 is disposed at the upper-side end of the piston 131. The lower-end side valve 137 is disposed at the lower-end side of the piston 131. The attenuation force generation unit 130 also includes a piston bolt 140 and a nut 145. The piston bolt 140 supports the piston 131, the upper-end side valve 136, the lower-end side valve 137, and other members. The nut 145 is screwed on the piston bolt 140 to determine the positions of the piston 131, the upper-end side valve 136, the lower-end side valve 137, and other members.

The piston 131 is a hollow cylindrical member and has on its outer surface a hermetic member sealing the gap between the cylinder 230 and the piston 131. The piston 131 also has a first through hole 132 and a second through hole 133, which are through holes open in the axial direction. The piston 131 includes first radial conduits 134 and second radial conduits 135. The first radial conduits 134 radially extend at the upper-side end of the piston 131 and communicate with the first through hole 132. The second radial conduits 135 radially extend at the lower-side end of the piston 131 and communicate with the second through hole 133. A non-limiting example of the number of each of the first through holes 132 and the second through holes 133 is three. The three first through holes 132 and the three second through holes 133 are each disposed at equal intervals in a circumferential direction and at positions respectively corresponding to the first through hole 132 and the second through hole 133.

The piston bolt 140 includes the shaft 141 and a base 142. The shaft 141 is disposed on an upper end side of the piston bolt 140 and has a solid cylindrical shape. The base 142 is disposed on a lower end side of the piston bolt 140 and has a solid cylindrical shape of larger radius than a radius of the shaft 141. In the piston bolt 140, a depression 143 is formed over a depth from the lower-side end surface of the base 142 to the shaft 141. At the upper-side end of the depression 143, a radial through hole 144 is formed. The radial through hole 144 radially penetrates the depression 143 to allow the depression 143 to communicate with an outside of the shaft 141.

On the upper-side end of the nut 145, a female thread 146 is formed. The female thread 146 receives a male thread of the piston bolt 140. Under the female thread 146, a depression 147 is formed. The depression 147 is depressed over a depth from the lower-side end surface of the nut 145, and has a solid cylindrical shape of larger radius than the radius of the root of the female thread 146. In the nut 145, a radial through hole 148 is formed. The radial through hole 148 radially penetrates the nut 145 to allow the outside of the nut 145 to communicate with the depression 147.

With the configuration described hereinbefore, the attenuation force generation unit 130 is held on the rod 150 with the male thread on the upper-side end of the rod 150 screwed on the female thread on the depression 143 of the piston bolt 140. The piston 131 is in contact with the inner surface of the cylinder 230 through the hermetic member on the outer surface of the piston 131. Thus, the piston 131 defines a first oil chamber 51 and a second oil chamber 52 in the space inside the cylinder 230. The first oil chamber 51 is upper than the piston 131, and the second oil chamber 52 is lower than the piston 131.

Configuration of Rod Holding Member 160

The rod holding member 160 has a plurality of solid cylindrical portions of different diameters. Namely, the rod holding member 160 includes the upper-end-side solid cylindrical portion 161, a lower-end-side solid cylindrical portion 162, and an intermediate solid cylindrical portion 163. The upper-end-side solid cylindrical portion 161 is disposed at the upper-side end of the rod holding member 160. The lower-end-side solid cylindrical portion 162 is disposed at the lower-side end of the rod holding member 160. The intermediate solid cylindrical portion 163 is disposed between the upper-end-side solid cylindrical portion 161 and the lower-end-side solid cylindrical portion 162.

The upper-end-side solid cylindrical portion 161 has the axial depression 161a, a radial depression 161b, and a radial through hole 161c. The axial depression 161a is depressed over a depth in the axial direction from an upper-side end surface of the upper-end-side solid cylindrical portion 161. The radial depression 161b is depressed radially throughout a circumference of the upper-end-side solid cylindrical portion 161 over a depth from an outer surface of the upper-end-side solid cylindrical portion 161. The radial through hole 161c penetrates the axial depression 161a and the radial depression 161b in a radial direction.

The axial depression 161a also has an inclined surface 161e. The inclined surface 161e is inclined relative to the axial direction, that is, an inner diameter of the inclined surface 161e gradually decreases in a lower side direction.

Configuration of Support-Member Holding Member 180

The support-member holding member 180 is a hollow cylindrical member. The support-member holding member 180 has a communication hole 182. The communication hole 182 is formed at a position axially corresponding to the radial depression 161b of the rod holding member 160, and thus allows an inside of the support-member holding member 180 to communicate with an outside of the support-member holding member 180.

In the axle side unit 100 with the configuration described hereinbefore, a reservoir chamber 40 (storage chamber) is defined between the inner surface of the outer member 110 and the outer surfaces of the rod 150 and the support-member holding member 180. The reservoir chamber 40 stores oil kept hermetic in the front fork 21.

Configuration of Body Side Unit 200

The body side unit 200 includes the inner tube 210 and a cap 220. The inner tube 210 has a hollow cylindrical shape with open ends. The cap 220 is mounted on an upper-side end of the inner tube 210.

The body side unit 200 also includes the cylinder 230 and a hermetic member 240. The cylinder 230 has a hollow cylindrical shape. The hermetic member 240 is mounted on a lower-side end of the cylinder 230, and keeps space inside the cylinder 230 hermetic.

The body side unit 200 also includes a front-wheel spring length adjustment unit 250 and the front-wheel passage switch unit 300. The front-wheel spring length adjustment unit 250 supports the front-wheel spring 500 at its upper-side end and adjusts (changes) a length of the front-wheel spring 500. The front-wheel passage switch unit 300 is mounted on an upper-side end of the cylinder 230 and selects a passage for the oil.

The body side unit 200 also includes a front-wheel relative position detector 281 (see FIG. 11). The front-wheel relative position detector 281 detects a position of an upper-side end support member 270 relative to a base member 260, described later, of the front-wheel spring length adjustment unit 250.

Configuration of Cap 220

The cap 220 is an approximately hollow cylindrical member. On the outer surface of the cap 220, a male thread 221 is formed. The male thread 221 is screwed on the female thread 213, which is formed on the inner tube 210. On the inner surface of the cap 220, a female thread is formed that receives male threads on the front-wheel spring length adjustment unit 250 and the front-wheel passage switch unit 300. The cap 220 is mounted on the inner tube 210 and holds the front-wheel spring length adjustment unit 250 and the front-wheel passage switch unit 300.

The cap 220 includes an O ring 222. The O ring 222 keeps the space inside the inner tube 210 liquid tight.

Configuration of Front-Wheel Spring Length Adjustment Unit 250

The front-wheel spring length adjustment unit 250 includes the base member 260 and the upper-side end support member 270. The base member 260 is secured on the cap 220. The upper-side end support member 270 supports the front-wheel spring 500 at its upper-side end, and is movable in the axial direction relative to the base member 260. Thus, the upper-side end support member 270 adjusts the length of the front-wheel spring 500.

The base member 260 is an approximately hollow cylindrical member. The base member 260 has a protrusion 260b at an upper-side end of the base member 260. The protrusion 260b is a radially protruding part of a circumference of the base member 260. A discharge passage 41 is disposed between the protrusion 260b and a lower-side end on an outer surface of a support member 400, described later. The discharge passage 41 is for the oil in the cylinder 230 to be discharged into the reservoir chamber 40. A ring-shaped passage 61 is defined between an inner surface of the base member 260 and an outer surface of the cylinder 230. The ring-shaped passage 61 has a ring shape.

The upper-side end support member 270 includes a hollow cylindrical portion 271 and an internally facing portion 272. The hollow cylindrical portion 271 has a hollow cylindrical shape. The internally facing portion 272 radially internally extends from the lower-side end of the hollow cylindrical portion 271. The upper-side end support member 270 defines a jack chamber 60 in the space defined between the outer surface of the cylinder 230 and the lower-side end of the base member 260. The jack chamber 60 stores oil for use in adjusting the position of the upper-side end support member 270 relative to the base member 260.

The hollow cylindrical portion 271 has a radial through hole 273. The radial through hole 273 radially penetrates the hollow cylindrical portion 271 and thus allows an inside of the hollow cylindrical portion 271 to communicate with an outside of the hollow cylindrical portion 271. Through the radial through hole 273, the oil in the jack chamber 60 is discharged into the reservoir chamber 40. In this manner, the displacement of the upper-side end support member 270 relative to the base member 260 is limited.

The jack chamber 60 is supplied the oil in the cylinder 230 through the ring-shaped passage 61, which is defined between the inner surface of the base member 260 and the outer surface of the cylinder 230. This configuration will be detailed later.

Configuration of Front-Wheel Relative Position Detector 281

The front-wheel relative position detector 281 (see FIG. 11) detects, for example, an amount of displacement of the upper-side end support member 270 in the vertical direction relative to the base member 260, that is, an amount of displacement of the upper-side end support member 270 in the vertical direction relative to the body frame 11. In a non-limiting embodiment, a coil is wound around the outer surface of the base member 260, and the upper-side end support member 270 is made of magnetic material. Based on an impedance of the coil, which changes in accordance with the displacement of the upper-side end support member 270 in the vertical direction relative to the base member 260, the front-wheel relative position detector 281 detects the amount of displacement of the upper-side end support member 270.

Configuration of Front-Wheel Passage Switch Unit 300

Figure 3:
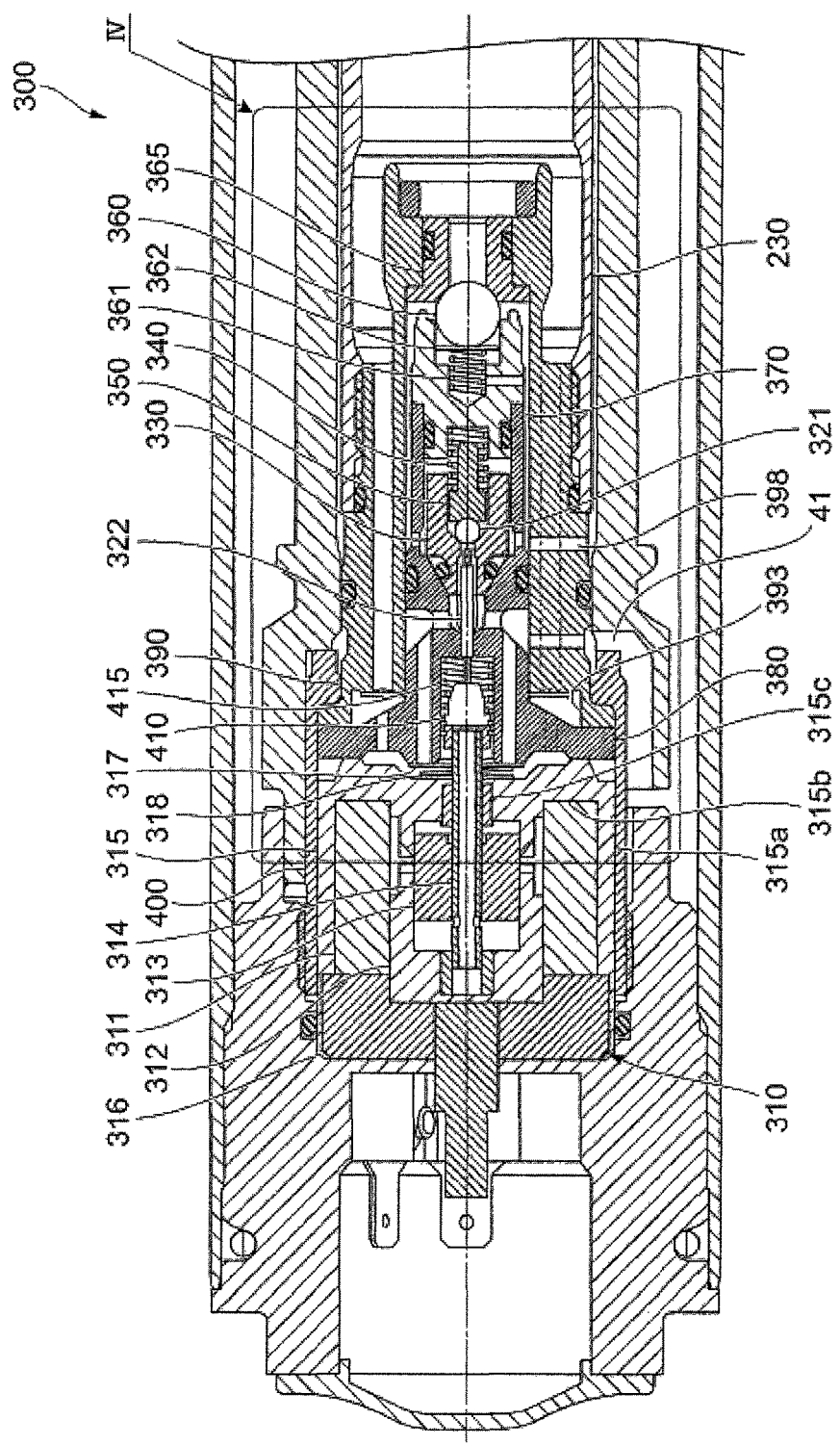
FIG. 3 is an enlarged view of part III illustrated in FIG. 2.

FIG. 3 is an enlarged view of part III illustrated in FIG. 2.

Figure 4:
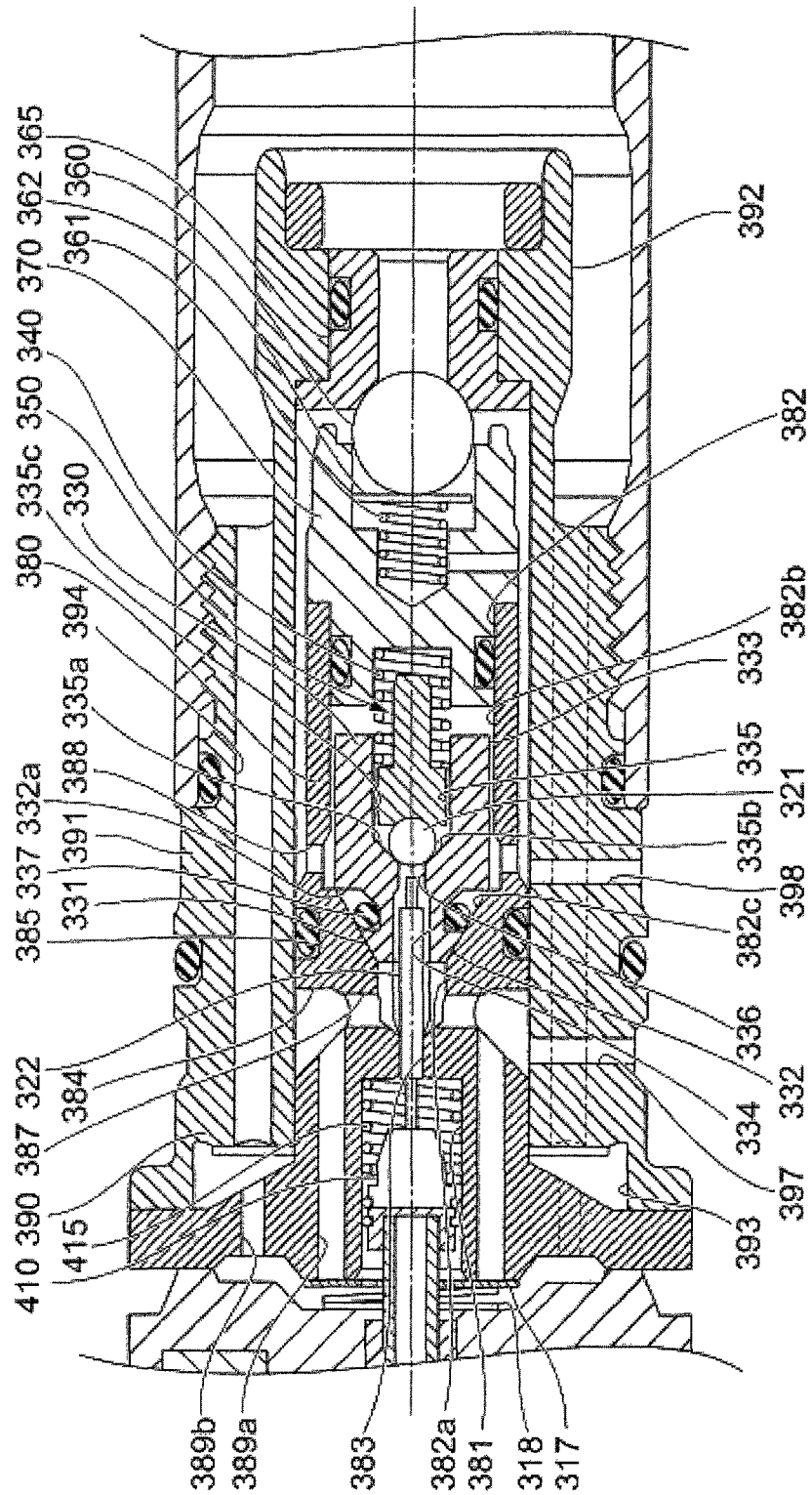
FIG. 4 is an enlarged view of part IV illustrated in FIG. 3.

FIG. 4 is an enlarged view of part IV illustrated in FIG. 3.

The front-wheel passage switch unit 300 is a device that switches among a first option, a second option, and a third option. In the first option, the front-wheel passage switch unit 300 supplies oil discharged from a pump 600, described later, to the reservoir chamber 40. In the second option, the front-wheel passage switch unit 300 supplies the oil discharged from the pump 600 to the jack chamber 60. In the third option, the front wheel passage switch unit 300 supplies the oil accommodated in the jack chamber 60 to the reservoir chamber 40.

The front-wheel passage switch unit 300 includes a front-wheel solenoid 310, a spherical valve body 321, a push rod 322, a valve-body seat member 330, a coil spring 340, and a press member 350. The push rod 322 presses the valve body 321. The valve-body seat member 330 has a resting surface for the valve body 321. The press member 350 receives the spring force of the coil spring 340 to press the valve body 321 against the resting surface.

The front-wheel passage switch unit 300 also includes a ball 360, a coil spring 361, and a disc 362. The coil spring 361 applies axial urging force to the ball 360. The disc 362 is disposed between the ball 360 and the coil spring 361. The front-wheel passage switch unit 300 also includes a ball seat member 365 and an accommodation member 370. The ball seat member 365 has a resting surface for the ball 360. The accommodation member 370 accommodates the coil spring 361 and the disc 362.

The front-wheel passage switch unit 300 also includes a valve accommodation inner member 380, a valve accommodation outer member 390, and the support member 400. The valve accommodation inner member 380 accommodates the valve body 321, the valve-body seat member 330, and other members. The valve accommodation outer member 390 is disposed outside the valve accommodation inner member 380, and accommodates the ball 360, the ball seat member 365, and other members. The support member 400 supports the valve accommodation inner member 380 and the valve accommodation outer member 390.

The front-wheel passage switch unit 300 also includes a transmission member 410 and a coil spring 415. The transmission member 410 is mounted on the lower end of an operation rod 314, described later, of the front-wheel solenoid 310, and transmits thrust of the front-wheel solenoid 310 to the push rod 322. The coil spring 415 applies axial urging force to the transmission member 410.

Configuration of Front-Wheel Solenoid 310

The front-wheel solenoid 310 is a proportional solenoid that includes a coil 311, a core 312, a plunger 313, and an operation rod 314. The core 312 is disposed inside the coil 311. The plunger 313 is guided by the core 312. The operation rod 314 is coupled to the plunger 313.

The front-wheel solenoid 310 also includes a case 315 and a cover 316. The case 315 accommodates the coil 311, the core 312, the plunger 313, and other members. The cover 316 covers an opening of the case 315.

The case 315 includes a hollow cylindrical portion 315a and an internally facing portion 315b. The hollow cylindrical portion 315a has a hollow cylindrical shape. The internally facing portion 315b radially internally extends from the lower-end end of the hollow cylindrical portion 315a. The internally facing portion 315b has a through hole through which the operation rod 314 is inserted. A guide bush 315c is fitted with the internally facing portion 315b to guide the movement of the operation rod 314.

The operation rod 314 has a hollow cylindrical shape. At the upper-side end, the operation rod 314 is accommodated in the case 315. At the lower-side end, the operation rod 314 protrudes from the case 315. The portion of the operation rod 314 protruding from the case 315 is attached with a disc-shaped valve 317. The disc-shaped valve 317 opens and closes a passage, described later, formed in the valve accommodation inner member 380. A coil spring 318 surrounds the portion of the operation rod 314 between the valve 317 and the case 315. The coil spring 318 applies an axial urging force to the valve 317.

With the configuration of the front-wheel solenoid 310 described hereinbefore, the coil 311 is supplied a current through a connector and a lead that are mounted on the cap 220. The current causes the plunger 313 to generate an axial thrust that accords with the amount of the current. The thrust of the plunger 313 causes the operation rod 314, which is coupled to the plunger 313, to make an axial movement. In the front-wheel solenoid 310 according to this embodiment, the plunger 313 generates an amount of axial thrust that causes the operation rod 314 to protrude from the case 315 by an amount that increases as the current supplied to the coil 31 increases.

The amount of the current supplied to the coil 311 is controlled by the controller 70.

Configuration of Valve-Body Seat Member 330

The valve-body seat member 330 includes a conical portion 332 and a solid cylindrical portion 333. The conical portion 332 has an inclined surface 331. The inclined surface 331 is inclined relative to the axial direction, that is, the outer diameter of the valve-body seat member 330 gradually increases in the lower side direction. The solid cylindrical portion 333 has a solid cylindrical shape.

The conical portion 332 has an upper-end depression 334. The upper-end depression 334 is depressed over a depth in the axial direction from an upper-side end surface of the conical portion 332. The solid cylindrical portion 333 has a lower-end depression 335 and a communication hole 336. The lower-end depression 335 is depressed over a depth in the axial direction from a lower-side end surface of the solid cylindrical portion 333. The communication hole 336 allows the lower-end depression 335 to communicate with the upper-end depression 334.

The lower-end depression 335 includes a conical depression 335b and a cylindrical depression 335c. The conical depression 335b, which has a conical shape, has an inclined surface 335a. The inclined surface 335a is inclined relative to the axial direction, that is, a radius of the conical depression 335b gradually increases in the lower side direction. The cylindrical depression 335c has a cylindrical shape.

The conical portion 332 has a groove 332a on an outer surface of the conical portion 332. The groove 332a is depressed radially throughout a circumference of the conical portion 332. An O ring 337 is fitted in the groove 332a to seal a gap between the conical portion 332 and the valve accommodation inner member 380.

Configuration of Valve Accommodation Inner Member 380

The valve accommodation inner member 380 is an approximately solid cylindrical member with a flange formed at the upper-side end of the valve accommodation inner member 380. The valve accommodation inner member 380 has an upper-end depression 381, a lower-end depression 382, and a communication hole 383. The upper-end depression 381 is depressed over a depth in the axial direction from the upper-side end surface of the valve accommodation inner member 380. The lower-end depression 382 is depressed over a depth in the axial direction from the lower-side end surface of the valve accommodation inner member 380. Through the communication hole 383, the upper-end depression 381 and the lower-end depression 382 communicate with each other.

On the outer surface of the valve accommodation inner member 380, a first radial depression 384 and a second radial depression 385 are formed. The first radial depression 384 and the second radial depression 385 are depressed radially throughout the circumference of the valve accommodation inner member 380.

The upper-end depression 381 has a solid cylindrical shape that accommodates the transmission member 410 and the coil spring 415.

The lower-end depression 382 includes a first cylindrical depression 382a, a second cylindrical depression 382b, and a conical depression 382c. The first cylindrical depression 382a and the second cylindrical depression 382b have cylindrical shapes of different diameters. The conical depression 382c is formed between the first cylindrical depression 382a and the second cylindrical depression 382b, and has an inclined surface inclined relative to the axial direction, that is, the radius of the conical depression 382c gradually increases in the lower side direction.

The valve accommodation inner member 380 has a plurality of first radial communication holes 387, which are formed at equal intervals in the circumferential direction. Each first radial communication hole 387 is a radial through hole through which the first cylindrical depression 382a of the lower-end depression 382 and the first radial depression 384 communicate with each other.

The valve accommodation inner member 380 has a plurality of second radial communication holes 388, which are formed at equal intervals in the circumferential direction. Each second radial communication hole 388 is a radial through hole through which the second cylindrical depression 382b and the outside of the valve accommodation inner member 380 communicate with each other.

The valve accommodation inner member 380 has a plurality of inner axial communication holes 389a formed at equal intervals in the circumferential direction. Each inner axial communication hole 389a is an axial through hole through which the upper-side end of the valve accommodation inner member 380 and the first radial depression 384 communicate with each other.

The valve accommodation inner member 380 has a plurality of outer axial communication holes 389b formed at equal intervals in the circumferential direction. The outer axial communication holes 389b axially penetrate the flange.

Configuration of Valve Accommodation Outer Member 390

The valve accommodation outer member 390 includes a first hollow cylindrical portion 391, a second hollow cylindrical portion 392, and a flange. The first hollow cylindrical portion 391 and the second hollow cylindrical portion 392 have cylindrical shapes of different diameters. The flange extends radially outwardly from the upper-side end of the first hollow cylindrical portion 391. The first hollow cylindrical portion 391 has an outer diameter larger than the outer diameter of the second hollow cylindrical portion 392.

The valve accommodation outer member 390 has an upper-end depression 393. The upper-end depression 393 is depressed over a depth in the axial direction from the upper-side end surface of the valve accommodation outer member 390.

The first hollow cylindrical portion 391 has a plurality of axial communication holes 394, which are formed at equal intervals in the circumferential direction. Each axial communication hole 394 allows the upper-end depression 393 to communicate with the space that is below the first hollow cylindrical portion 391 and defined between the outer surface of the second hollow cylindrical portion 392 and the inner surface of the cylinder 230.

The first hollow cylindrical portion 391 has a plurality of first radial communication holes 397 and a plurality of second radial communication holes 398. The first radial communication holes 397 and the second radial communication holes 398 are radial through holes that allow an inside of the first hollow cylindrical portion 391 to communicate with an outside of the first hollow cylindrical portion 391. The first radial communication holes 397 and the second radial communication holes 398 are formed at equal intervals in the circumferential direction and at positions on the first hollow cylindrical portion 391 where no axial communication holes 394 are formed.

With the configuration of the front-wheel passage switch unit 300 described hereinbefore, when supply of current to the coil 311 of the front-wheel solenoid 310 is stopped or when the current supplied to the coil 311 is less than a predetermined first reference current, the valve 317, which is mounted on the operation rod 314, does not rest on the upper-side end surface of the valve accommodation inner member 380. This releases open the opening on the upper end side of the inner axial communication hole 389a, which is formed in the valve accommodation inner member 380.

When the current supplied to the coil 311 of the front-wheel solenoid 310 is equal to or higher than the first reference current, the operation rod 314 moves in the lower side direction to make the valve 317, which is mounted on the operation rod 314, rest on the upper-side end surface of the valve accommodation inner member 380 to close the opening on the upper end side of the inner axial communication hole 389a.

When the current supplied to the coil 311 of the front-wheel solenoid 310 is equal to or higher than a predetermined second reference current, which is higher than the first reference current, the operation rod 314 moves further in the lower side direction. Then, the operation rod 314 pushes the push rod 322 in the lower side direction through the transmission member 410. When the push rod 322 is pushed in the lower side direction, the valve body 321 is pushed by the push rod 322 away from the inclined surface 335a of the lower-end depression 335 of the valve-body seat member 330.

When the supply of current to the coil 311 is stopped or when the current supplied to the coil 311 is less than the first reference current, the valve 317, which is mounted on the operation rod 314, releases the inner axial communication hole 389a, which is formed in the valve accommodation inner member 380, and the valve body 321 rests on the inclined surface 335a of the lower-end depression 335 of the valve-body seat member 330. This state will be hereinafter referred to as first switch state.

When the current supplied to the coil 311 is equal to or higher than the first reference current and less than the second reference current, the valve 317, which is mounted on the operation rod 314, closes the inner axial communication hole 389a, which is formed in the valve accommodation inner member 380, and the valve body 321 rests on the inclined surface 335a of the lower-end depression 335 of the valve-body seat member 330. This state will be hereinafter referred to as second switch state.

When the current supplied to the coil 311 is equal to or higher than the second reference current and less than a third reference current, the valve 317, which is mounted on the operation rod 314, closes the inner axial communication hole 389a, which is formed in the valve accommodation inner member 380, and the valve body 321 is away from the inclined surface 335a of the lower-end depression 335 of the valve-body seat member 330. This state will be hereinafter referred to as a third switch state.

The first reference current and the second reference current are respectively 0.1 A and 0.5 A, for example. The maximum current flowing to the coil 311 of the front-wheel solenoid 310 is 3.2 A, for example.

When the current supplied to the coil 311 is equal to or higher than the third reference current, the valve 317, which is mounted on the operation rod 314, closes the inner axial communication hole 389a, which is formed in the valve accommodation inner member 380, and the inclined surface 331 of the conical portion 332 of the valve-body seat member 330 is away from the inclined surface on the conical depression 382c of the valve accommodation inner member 380. This state will be hereinafter referred to as fourth switch state. In the fourth switch state, the valve body 321 rests on the inclined surface 335a of the lower-end depression 335 of the valve-body seat member 330.

Operation of Front Fork 21

With the configuration of the front fork 21 described hereinbefore, the front-wheel spring 500 supports the weight of the motorcycle 1 and thus absorbs impact. The attenuation force generation unit 130 attenuates the vibration in the front-wheel spring 500.

Figure 5:
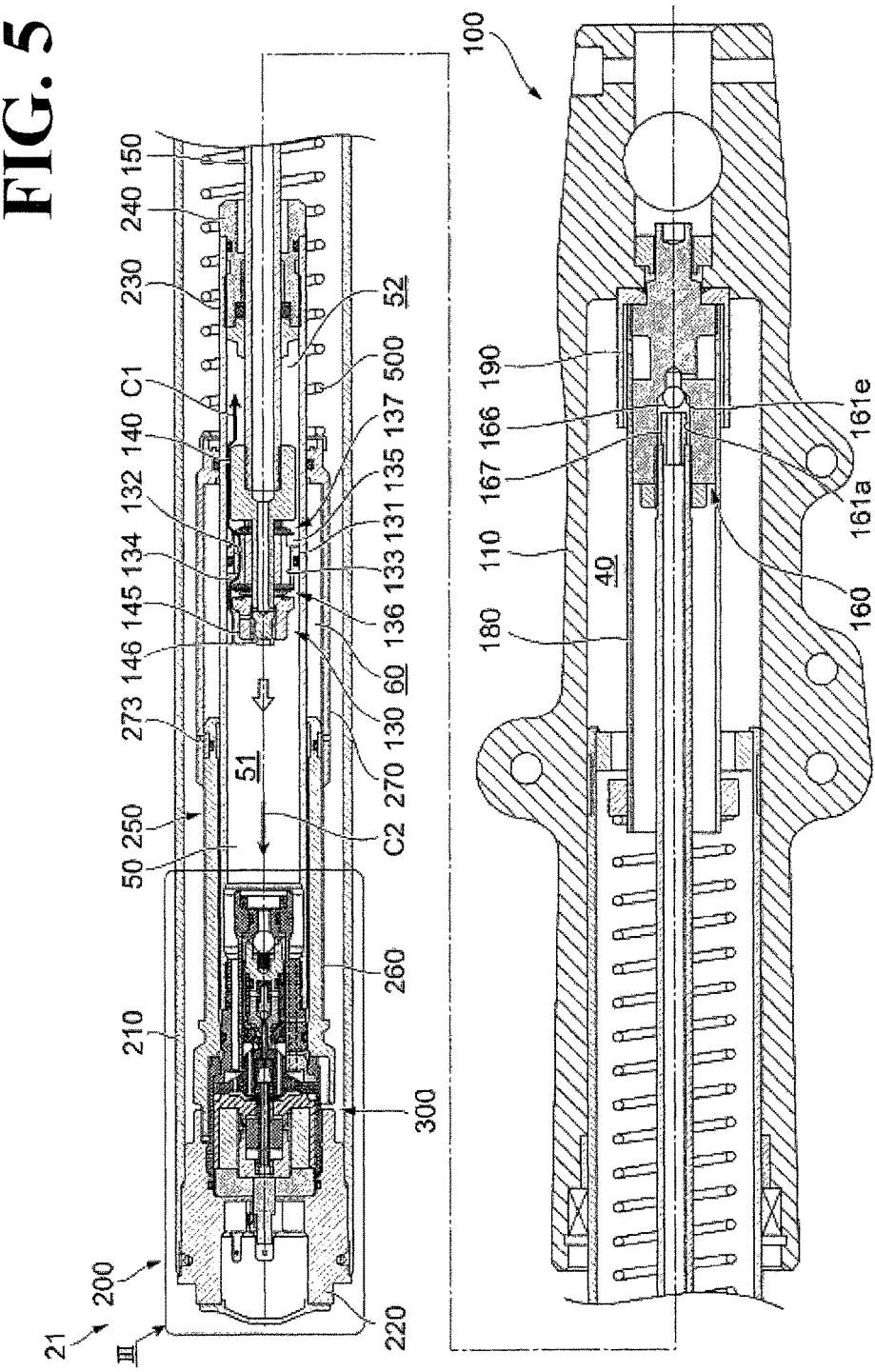
FIG. 5 illustrates how the front fork operates at a time of a compression stroke.

FIG. 5 illustrates how the front fork 21 operates at the time of a compression stroke.

In the compression stroke of the front fork 21, the piston 131 of the attenuation force generation unit 130 moves in the upper-side direction relative to the cylinder 230 as indicated by the outlined arrow. The movement of the piston 131 causes the oil in the first oil chamber 51 to be pressurized. This causes the lower-end side valve 137 covering the first through hole 132 to open and the oil to flow into the second oil chamber 52 through the first through hole 132 (see arrow C1). The oil flow from the first oil chamber 51 to the second oil chamber 52 is narrowed through the first through hole 132 and the lower-end side valve 137. This causes attenuation force for the compression stroke to be generated.

At the time of the compression stroke, the rod 150 enters the cylinder 230. The entry causes an amount of oil corresponding to the volume of the rod 150 in the cylinder 230 to be supplied to the jack chamber 60 or the reservoir chamber 40, which depends on the switch state selected by the front-wheel passage switch unit 300 (see arrow C2). The switch state selected by the front-wheel passage switch unit 300 as to which of the jack chamber 60 and the reservoir chamber 40 to supply the oil will be described later. Here, the attenuation force generation unit 130, the rod 150, the cylinder 230, and other elements function as a pump to supply the oil in the cylinder 230 to the jack chamber 60 or the reservoir chamber 40. In the following description, this pump will occasionally be referred to as "pump 600".

Figure 6:
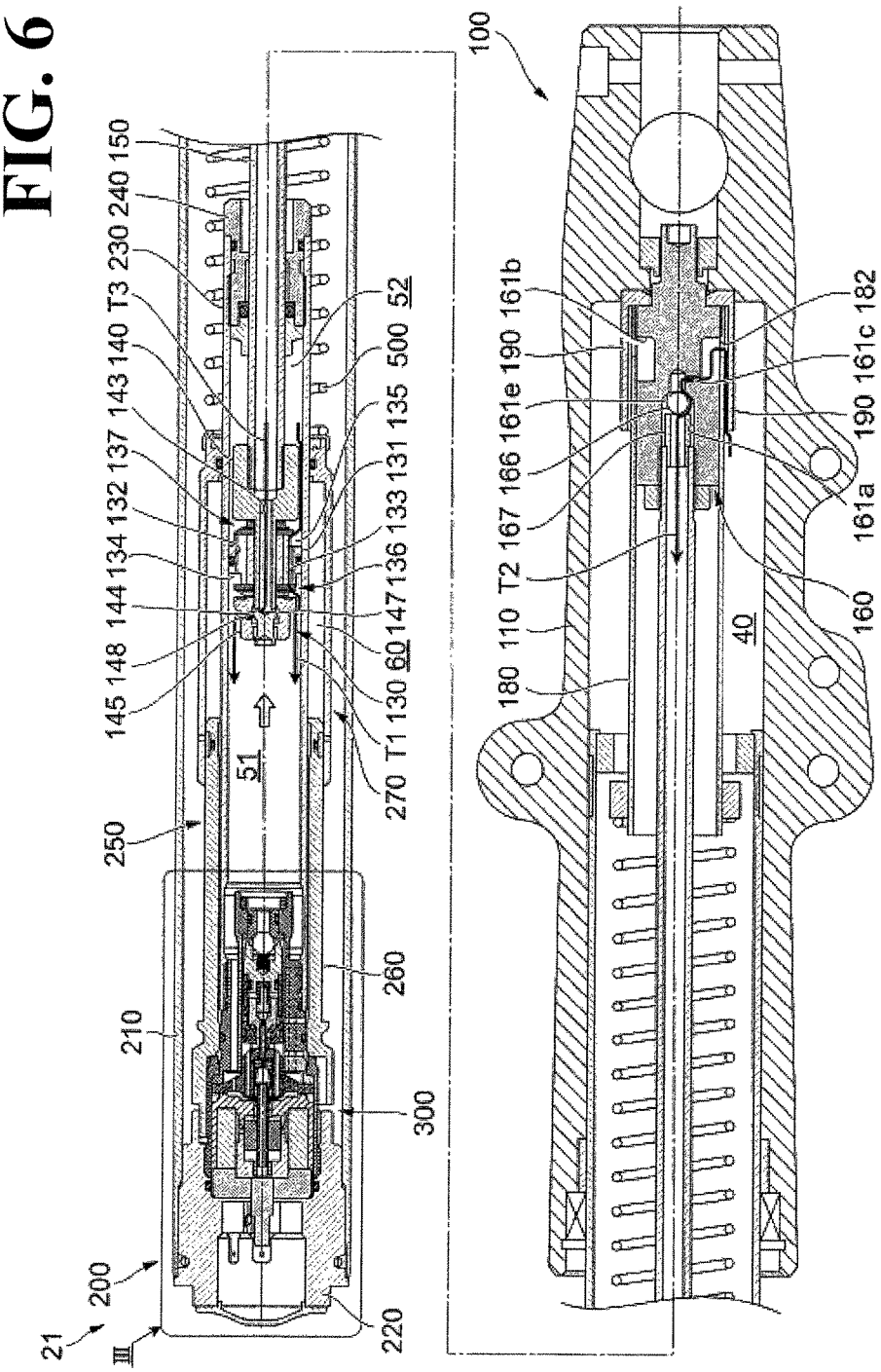
FIG. 6 illustrates how the front fork operates at a time of a rebound stroke.

FIG. 6 illustrates how the front fork 21 operates at the time of a rebound stroke.

In the rebound stroke of the front fork 21, the piston 131 of the attenuation force generation unit 130 moves in the lower-side direction relative to the cylinder 230 as indicated by the outlined arrow. The movement of the piston 131 causes the oil in the second oil chamber 52 to be pressurized. This causes the upper-end side valve 136 covering the second through hole 133 to open and the oil to flow into the first oil chamber 51 through the second through hole 133 (see arrow T1). The oil flow from the second oil chamber 52 to the first oil chamber 51 is narrowed through the second through hole 133 and the upper-end side valve 136. This causes attenuation force for the rebound stroke to be generated.

At the time of the rebound stroke, the rod 150 withdraws from the cylinder 230. The withdrawal causes an amount of oil corresponding to the volume of the rod 150 that has been in the cylinder 230 to be supplied from the reservoir chamber 40 to the first oil chamber 51. That is, the movement of the piston 131 in the lower-side direction causes the first oil chamber 51 to be depressurized and the oil in the reservoir chamber 40 to enter the first oil chamber 51. Specifically, the oil in the reservoir chamber 40 passes through the communication hole 182 of the support-member holding member 180 and the radial through hole 161c of the rod holding member 160, and enters the axial depression 161a of the rod holding member 160. Then, the oil moves the ball 166 in the upper-side direction and enters the rod 150 (see arrow T2). In the rod 150, the oil passes through the depression 143 of the piston bolt 140, the radial through hole 144, and the radial through hole 148 of the nut 145, and reaches the first oil chamber 51 (see arrow T3).

Thus, the communication hole 182 of the support-member holding member 180, the radial through hole 161c of the rod holding member 160, the axial depression 161a of the rod holding member 160, an inside of the rod 150, the depression 143 of the piston bolt 140, the radial through hole 144, and the radial through hole 148 of the nut 145 function as intake passages through which the oil is taken from the reservoir chamber 40 into the cylinder 230 (first oil chamber 51). The ball 166 and the inclined surface 161e, which is formed on the axial depression 161a of the rod holding member 160, function as a check valve that allows the oil to flow from the reservoir chamber 40 into the inside of the rod 150 and that limits discharge of the oil from the inside of the rod 150 to the reservoir chamber 40.

Figure 7:
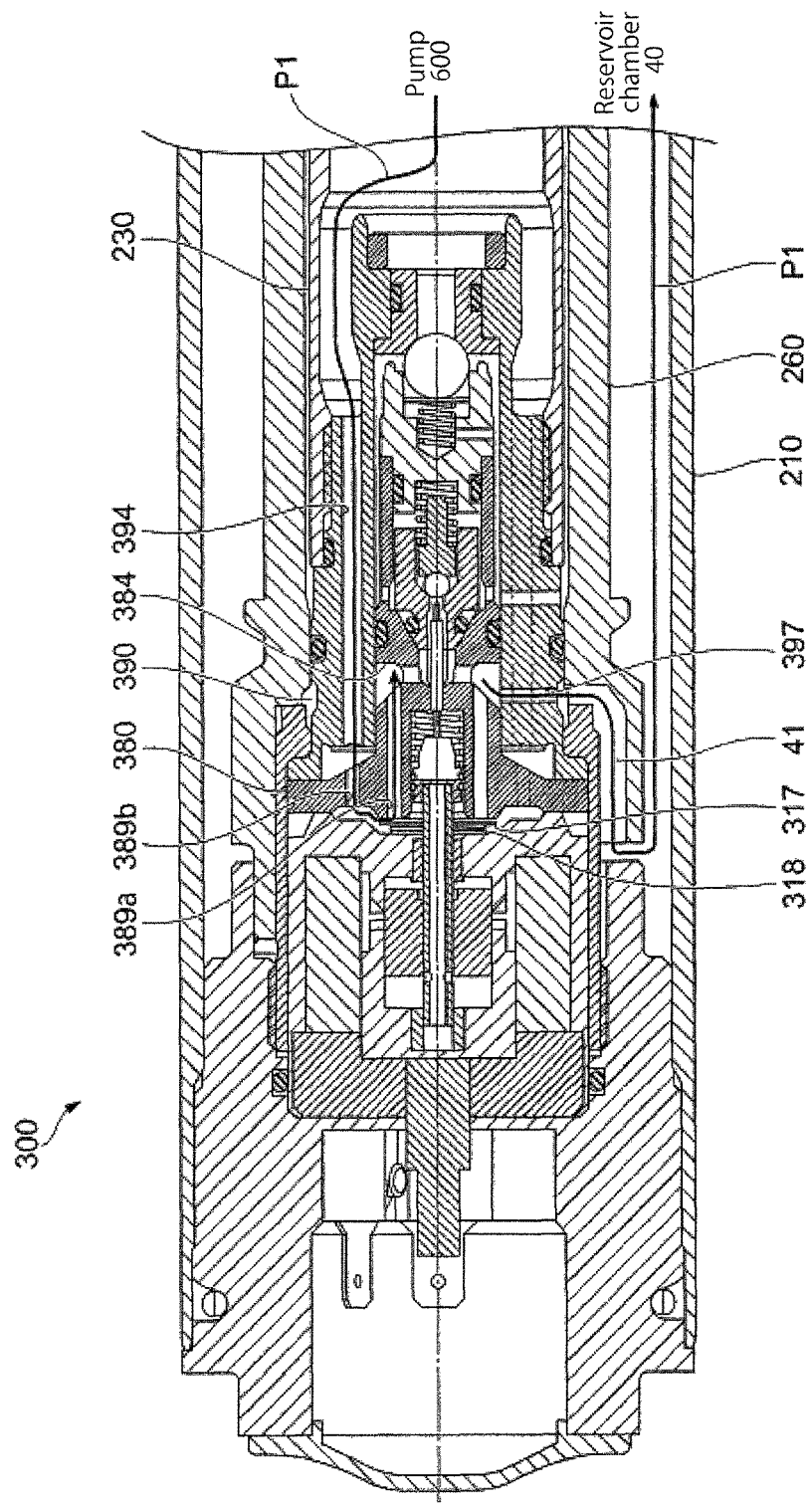
FIG. 7 illustrates a flow of oil in a front-wheel passage switch unit in a first switch state.

FIG. 7 illustrates a flow of oil in the front-wheel passage switch unit 300 in the first switch state.

When the front-wheel passage switch unit 300 is in the first switch state at the time of the compression stroke of the front fork 21, oil discharged from the pump 600, which is made up of members such as the attenuation force generation unit 130, the rod 150, and the cylinder 230, flows in the upper side direction through the axial communication holes 394, which are formed in the valve accommodation outer member 390 as indicated by arrow P1 in FIG. 7. The oil that has flown in the upper side direction through the axial communication holes 394, which are formed in the valve accommodation outer member 390, flows in the upper side direction through the outer axial communication hole 389b of the valve accommodation inner member 380, and then flows in the lower side direction through the inner axial communication hole 389a, which is open. Then, the oil flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the axial communication holes 394 of the valve accommodation outer member 390, the outer axial communication hole 389b and the inner axial communication hole 389a of the valve accommodation inner member 380, the first radial communication holes 397 of the valve accommodation outer member 390, and the discharge passage 41 function as a first communication passage R1 (see FIG. 11).

Through the first communication passage R1, the cylinder 230 and the reservoir chamber 40 communicate with each other. The valve 317, which is mounted on the operation rod 314, the coil spring 318, and the upper-side end of the valve accommodation inner member 380 function as a first communication passage switch valve V1 (see FIG. 11). The first communication passage switch valve V1 opens and closes the first communication passage R1.

Figure 8:
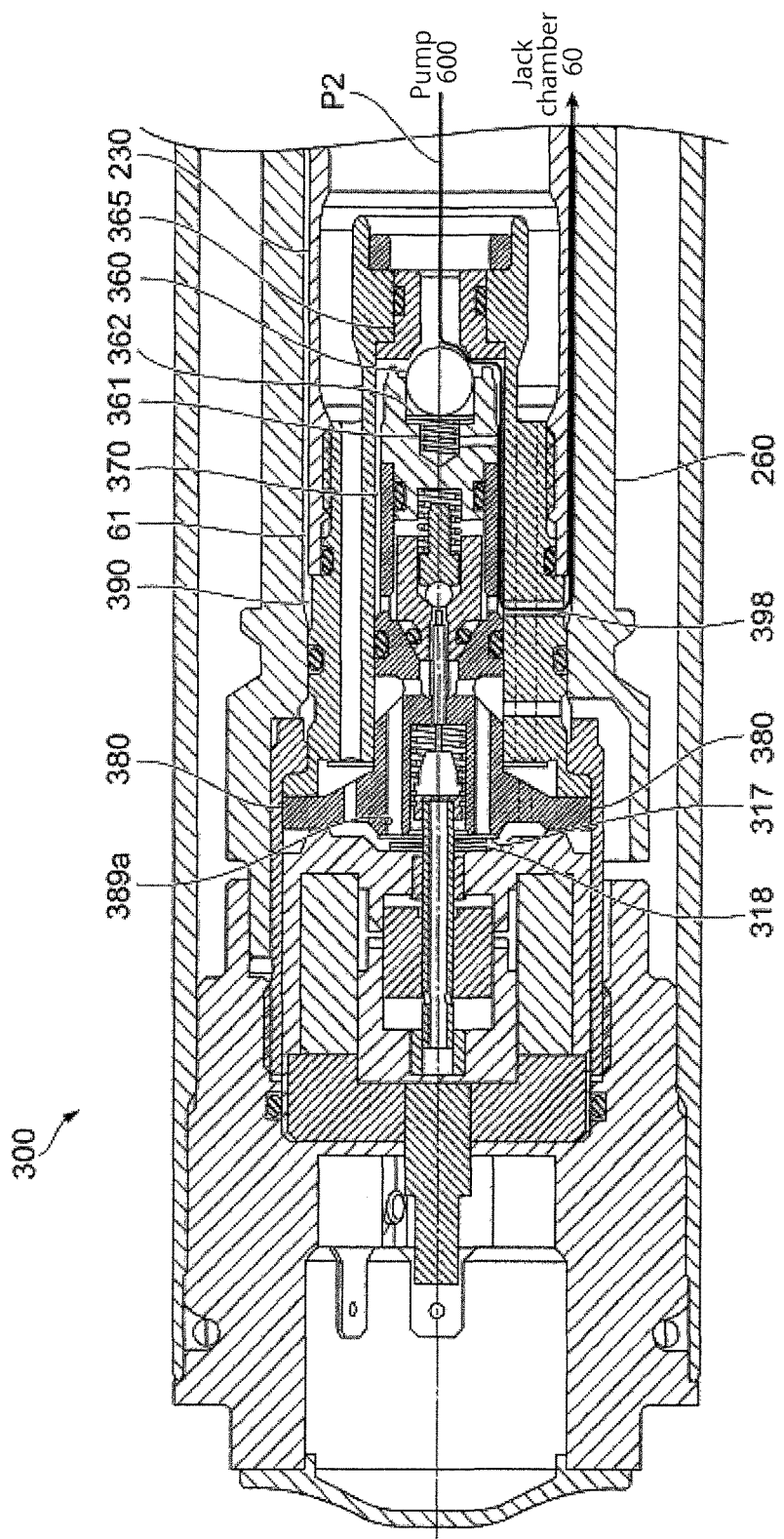
FIG. 8 illustrates a flow of the oil in the front-wheel passage switch unit in a second switch state.

FIG. 8 illustrates a flow of oil in the front-wheel passage switch unit 300 in the second switch state.

When the front-wheel passage switch unit 300 is in the second switch state at the time of the compression stroke of the front fork 21, the valve 317, which is mounted on the operation rod 314, closes the inner axial communication hole 389a, which is formed in the valve accommodation inner member 380. This causes the oil discharged from the pump 600 to flow to the jack chamber 60 as indicated by arrow P2 in FIG. 8. Specifically, the oil discharged from the pump 600 pushes up the ball 360 against the urging force of the coil spring 361, and flows in the upper side direction through the gap between the outer surface of the valve accommodation inner member 380 and the inner surface of the valve accommodation outer member 390 and the gap between the outer surface of the accommodation member 370 and the inner surface of the valve accommodation outer member 390. Then, the oil flows to the outside of the valve accommodation outer member 390 through the second radial communication holes 398 of the valve accommodation outer member 390. The oil that has passed through the second radial communication holes 398 flows to the jack chamber 60 through the ring-shaped passage 61, which is defined between the outer surface of the cylinder 230 and the inner surface of the base member 260 of the front-wheel spring length adjustment unit 250.

Thus, the gap between the outer surface of the valve accommodation inner member 380 and the inner surface of the valve accommodation outer member 390, the gap between the outer surface of the accommodation member 370 and the inner surface of the valve accommodation outer member 390, the second radial communication holes 398 of the valve accommodation outer member 390, and the ring-shaped passage 61 function as a second communication passage R2 (see FIG. 11). Through the second communication passage R2, the cylinder 230 and the jack chamber 60 communicate with each other. The ball 360, the coil spring 361, the disc 362, and the ball seat member 365 function as a second communication passage switch valve V2 (see FIG. 11). The second communication passage switch valve V2 opens and closes the second communication passage R2. The second communication passage switch valve V2 also functions as a check valve that allows oil to flow from the inside of the cylinder 230 into the jack chamber 60 and that inhibits the oil from flowing from the jack chamber 60 into the cylinder 230.

Figure 9:
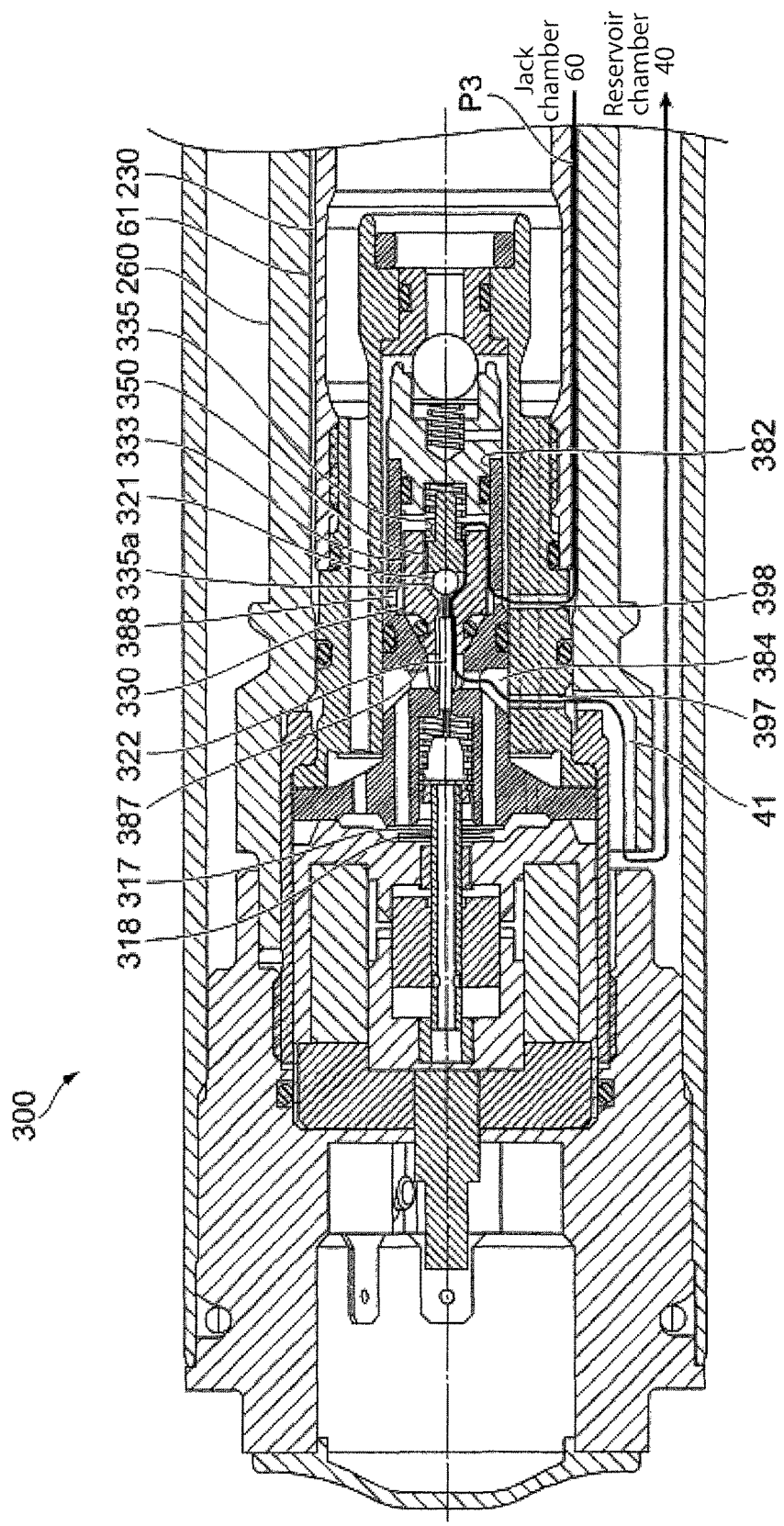
FIG. 9 illustrates a flow of the oil in the front-wheel passage switch unit in a third switch state.

FIG. 9 illustrates a flow of oil in the front-wheel passage switch unit 300 in the third switch state.

When the front-wheel passage switch unit 300 is in the third switch state at the time of the compression stroke of the front fork 21, the oil in the jack chamber 60 flows to the reservoir chamber 40 as indicated by arrow P3 in FIG. 9. Specifically, the oil in the jack chamber 60 enters the lower-end depression 382 of the valve accommodation inner member 380 through the ring-shaped passage 61, which is defined between the outer surface of the cylinder 230 and the inner surface of the base member 260 of the front-wheel spring length adjustment unit 250, through the second radial communication holes 398 of the valve accommodation outer member 390, and through the second radial communication holes 388 of the valve accommodation inner member 380. The oil that has entered the lower-end depression 382 of the valve accommodation inner member 380 flows in the lower side direction through the gap between the valve accommodation inner member 380 and the outer surface of the solid cylindrical portion 333 of the valve-body seat member 330, and enters the lower-end depression 335 of the valve-body seat member 330. The oil that has entered the lower-end depression 335 of the valve-body seat member 330 flows in the upper side direction through the gap between the press member 350 and the valve body 321 and the gap between the push rod 322 and the valve-body seat member 330, and passes through the first radial communication holes 387 of the valve accommodation inner member 380. The oil that has passed through the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap between the valve accommodation inner member 380 and the outer surface of the solid cylindrical portion 333 of the valve-body seat member 330, the gap between the press member 350 and the valve body 321, the gap between the push rod 322 and the valve-body seat member 330, the first radial communication holes 387 of the valve accommodation inner member 380, the first radial communication holes 397 of the valve accommodation outer member 390, and the discharge passage 41 function as a third communication passage R3 (see FIG. 11). Through the third communication passage R3, the jack chamber 60 and the reservoir chamber 40 communicate with each other. The valve body 321 and the inclined surface 335a of the lower-end depression 335 of the valve-body seat member 330 function as a third communication passage switch valve V3 (see FIG. 11). The third communication passage switch valve V3 opens and closes the third communication passage R3.

Figure 10:
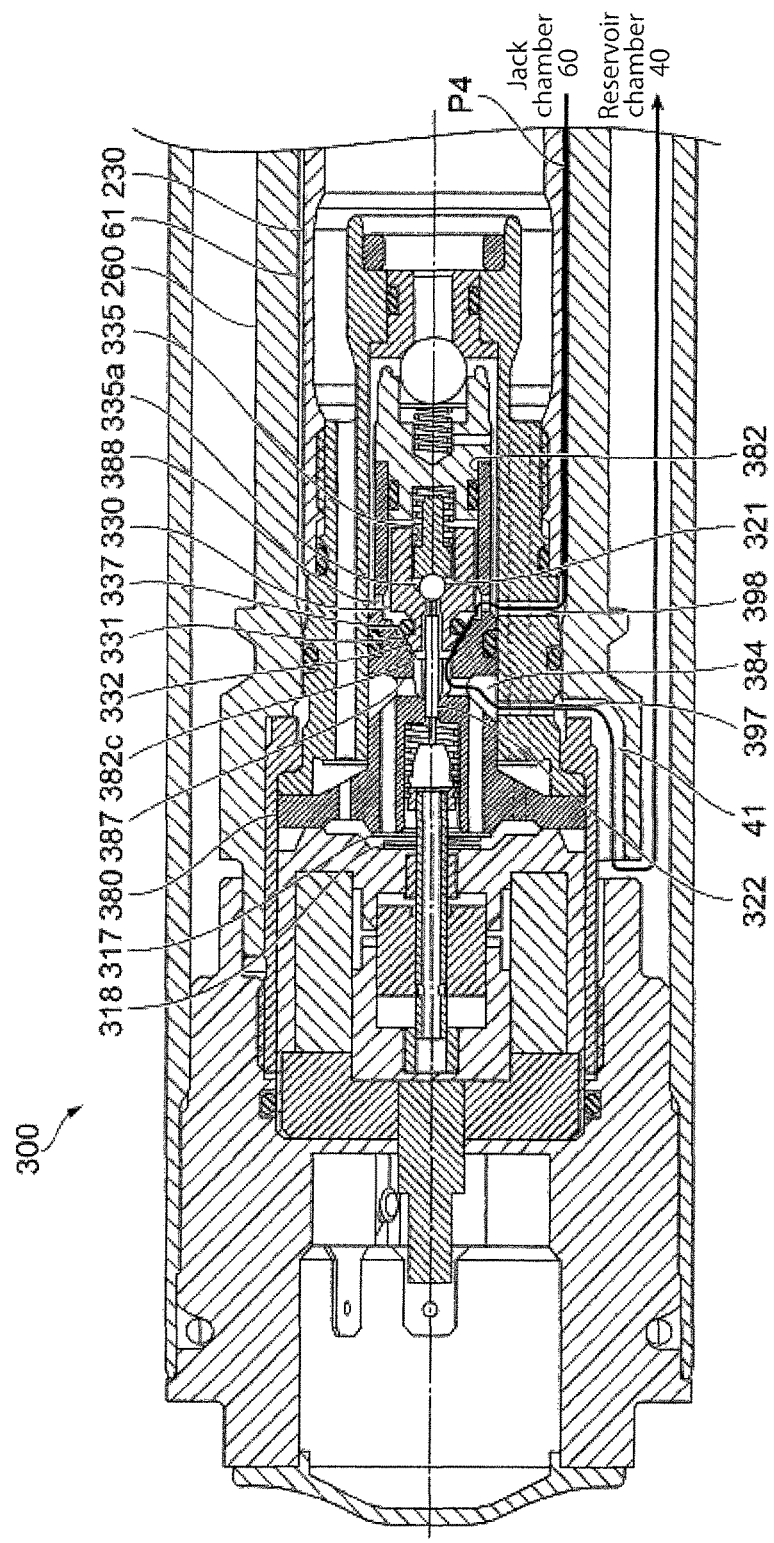
FIG. 10 illustrates a flow of the oil in the front-wheel passage switch unit in a fourth switch state.

FIG. 10 illustrates a flow of oil in the front-wheel passage switch unit 300 in the fourth switch state.

When the front-wheel passage switch unit 300 is in the fourth switch state at the time of the compression stroke of the front fork 21, the oil in the jack chamber 60 flows to the reservoir chamber 40 as indicated by arrow P4 in FIG. 10. Specifically, the oil in the jack chamber 60 enters the lower-end depression 382 of the valve accommodation inner member 380 through the ring-shaped passage 61, the second radial communication holes 398 of the valve accommodation outer member 390, and the second radial communication holes 388 of the valve accommodation inner member 380. The oil that has entered the lower-end depression 382 of the valve accommodation inner member 380 flows in the upper side direction through the gap defined by the inclined surface 331 of the conical portion 332 of the valve-body seat member 330, the O ring 337, and the inclined surface on the conical depression 382c of the valve accommodation inner member 380, and passes through the first radial communication holes 387 of the valve accommodation inner member 380. The oil that has passed the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260*b* of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap defined by the inclined surface 331 of the valve-body seat member 330, the O ring 337, and the inclined surface on the conical depression 382*c* of the valve accommodation inner member 380, the first radial communication holes 387 of the valve accommodation inner member 380, the first radial communication holes 397 of the valve accommodation outer member 390, and the discharge passage 41 function as a fourth communication passage R4 (not illustrated). Through the fourth communication passage R4, the jack chamber 60 and the reservoir chamber 40 communicate with each other. The inclined surface 331 of the conical portion 332 of the valve-body seat member 330, the O ring 337, and the inclined surface on the conical depression 382*c* of the valve accommodation inner member 380 function as a fourth communication passage switch valve V4 (not illustrated). The fourth communication passage switch valve V4 opens and closes the fourth communication passage R4.

Change From Third Switch State to Fourth Switch State of Front-Wheel Passage Switch Unit 300

When the front-wheel passage switch unit 300 is in the third switch state, the oil in the jack chamber 60 flows to the reservoir chamber 40 as indicated by arrow P3 illustrated in FIG. 9. This flow of the oil causes the amount of the oil in the jack chamber 60 to decrease, causing a reduction in length of the front-wheel spring 500. The reduction in length of the spring 500 causes the pressure in the jack chamber 60 to decrease. As a result, the pressure in a back pressure chamber defined between the valve-body seat member 330 and the accommodation member 370 at the time when the front-wheel passage switch unit 300 is in the third switch state is lower than the pressure in the back pressure chamber at the time when the front-wheel passage switch unit 300 is in the second switch state. This causes the valve-body seat member 330 to start to move in the lower side direction.

When the coil 311 of the front-wheel solenoid 310 is supplied a current that is equal to or higher than the third reference current, the push rod 322 moves the valve body 321 further in the lower side direction than when the passage switch unit 300 is in the third switch state. This enlarges the gap between the valve body 321 and the inclined surface 335*a* of the lower-end depression 335 of the valve-body seat member 330. As a result, the pressure in the jack chamber 60 further decreases, causing a further decrease in the pressure in the back pressure chamber. The further decrease in the pressure in the back pressure chamber causes the valve-body seat member 330 to move in the lower side direction. This causes the inclined surface 331 of the conical portion 332 of the valve-body seat member 330 to move away from the inclined surface on the conical depression 382*c* of the valve accommodation inner member 380. Thus, the third switch state changes to the fourth switch state.

Communication Passages Open or Closed in Accordance With Switch State Selected by Front-Wheel Passage Switch Unit 300

Figure 11A:
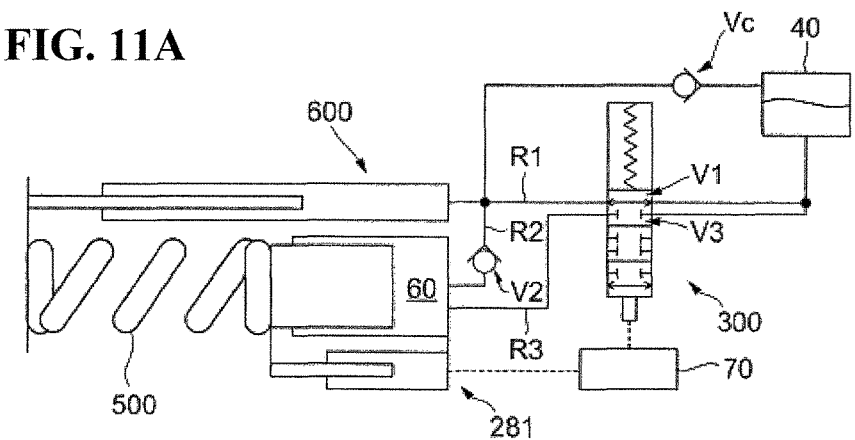
FIG. 11A illustrates whether a first communication passage, a second communication passage, and a third communication passage are open or closed when the front-wheel passage switch unit is in the first switch state.
Figure 11B:
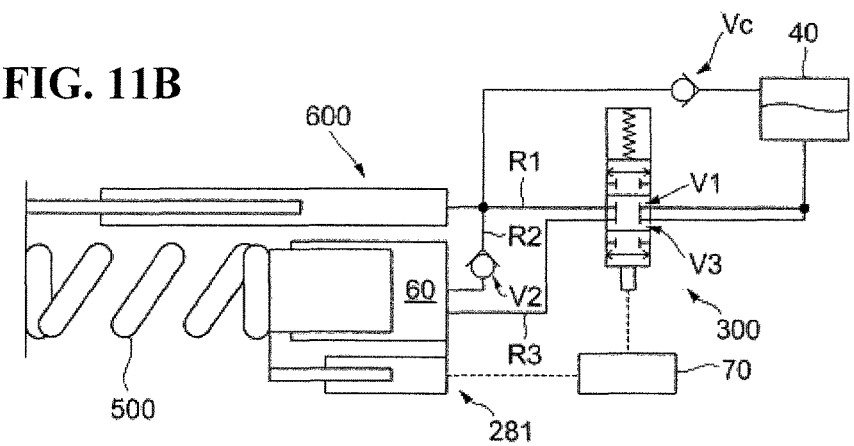
FIG. 11B illustrates whether the first communication passage, the second communication passage, and the third communication passage are open or closed when the front-wheel passage switch unit is in the second switch state.
Figure 11C:
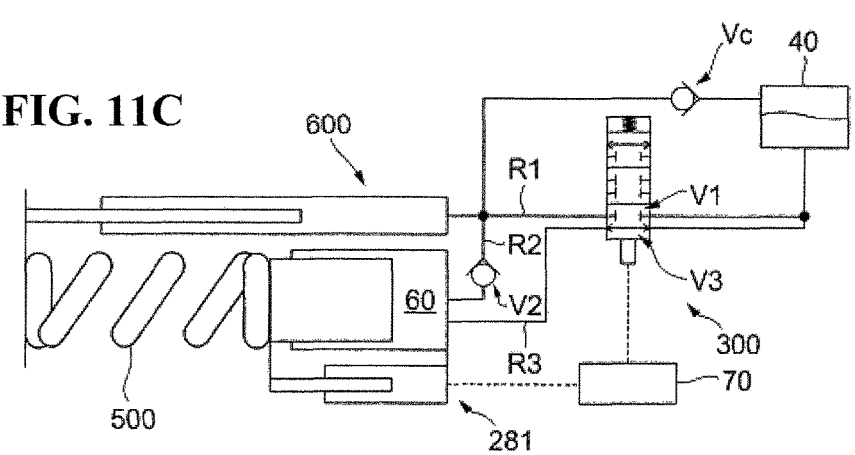
FIG. 11C illustrates whether the first communication passage, the second communication passage, and the third communication passage are open or closed when the front-wheel passage switch unit is in the third switch state.

FIG. 11A illustrates whether the first communication passage R1, the second communication passage R2, and the third communication passage R3 are open or closed when the front-wheel passage switch unit 300 is in the first switch state. FIG. 11B illustrates whether the first communication passage R1, the second communication passage R2, and the third communication passage R3 are open or closed when the front-wheel passage switch unit 300 is in the second switch state. FIG. 11C illustrates whether the first communication passage R1, the second communication passage R2, and the third communication passage R3 are open or closed when the front-wheel passage switch unit 300 is in the third switch state.

As illustrated in FIG. 11A, when the current supplied to the coil 311 of the front-wheel solenoid 310 is less than the first reference current, the front-wheel passage switch unit 300 is in the first switch state. That is, the first communication passage switch valve V1 is open and the third communication passage switch valve V3 is closed. This causes the oil discharged from the pump 600 to reach the reservoir chamber 40 through the first communication passage R1. In this case, the oil discharged from the pump 600 does not have such a high pressure as to open the second communication passage switch valve V2. Hence, the oil does not flow through the second communication passage R2. In other words, since the first communication passage switch valve V1 is open, the second communication passage switch valve V2 is closed. In the first switch state, the oil in the jack chamber 60 does not increase or decrease.

As illustrated in FIG. 11B, when the current supplied to the coil 311 of the front-wheel solenoid 310 is equal to or higher than the first reference current and less than the second reference current, the front-wheel passage switch unit 300 is in the second switch state. That is, the first communication passage switch valve V1 and the third communication passage switch valve V3 are closed. Thus, the oil discharged from the pump 600 opens the second communication passage switch valve V2 to reach the jack chamber 60 through the second communication passage R2. In the second switch state, the amount of the oil in the jack chamber 60 increases.

As illustrated in FIG. 11C, when the current supplied to the coil 311 of the front-wheel solenoid 310 is equal to or higher than the second reference current and less than the third reference current, the front-wheel passage switch unit 300 is in the third switch state. That is, the first communication passage switch valve V1 is closed and the third communication passage switch valve V3 is open. This causes the oil in the jack chamber 60 to reach the reservoir chamber 40 through the third communication passage R3. In the third switch state, the amount of the oil in the jack chamber 60 decreases.

When the current supplied to the coil 311 of the front-wheel solenoid 310 is equal to or higher than the third reference current, the front-wheel passage switch unit 300 is in the fourth switch state. That is, the first communication passage switch valve V1 is closed and the fourth communication passage switch valve V4 is open. This causes the oil in the jack chamber 60 to reach the reservoir chamber 40 through the fourth communication passage R4.

The passage defined in the fourth switch state by the gap defined by the inclined surface 331 of the conical portion 332 of the valve-body seat member 330, the O ring 337, and the inclined surface on the valve accommodation inner member 380 is wider than the passage defined in the third switch state by the gap between the valve accommodation inner member 380 and the outer surface of the solid cylindrical portion 333 of the valve-body seat member 330.

The passage defined in the third switch state by the gap between the valve body 321 and the inclined surface 335*a* on the valve-body seat member 330 is narrower than the passage defined in the third switch state by the gap between the valve accommodation inner member 380 and the outer surface of the solid cylindrical portion 333 of the valve-body seat member 330. Therefore, when the passage switch unit 300 is in the fourth switch state, the amount of the oil in the jack chamber 60 decreases more quickly than when the passage switch unit 300 is in the third switch state.

Up-And-Down of Vehicle Height

In the front fork 21 operating in the above-described manner, when the front-wheel passage switch unit 300 is in the second switch state, the oil discharged from the pump 600 at the time of the compression stroke flows into the jack chamber 60, increasing the amount of oil in the jack chamber 60. The increase in the amount of oil in the jack chamber 60 causes the upper-side end support member 270 to move in the lower-side direction relative to the base member 260 of the front-wheel spring length adjustment unit 250. The movement of the upper-side end support member 270 in the lower-side direction relative to the base member 260 causes the spring length of the front-wheel spring 500 to shorten. The shortened spring length of the front-wheel spring 500 causes the spring force of the front-wheel spring 500 in pressing the upper-side end support member 270 to increase as compared with the spring force before the movement of the upper-side end support member 270 relative to the base member 260. This causes an increase in preset load (pre-load), which is an amount of load that keeps the position of the body frame 11 unchanged relative to the position of the front wheel 2 even when force acts from the body frame 11 toward the front wheel 2 side. In this case, the amount of depression of the front fork 21 is smaller when the same amount of force acts in the axial direction from the body frame 11 (seat 19) side. Thus, when the spring length of the front-wheel spring 500 is shortened due to the movement of the upper-side end support member 270 relative to the base member 260, the height of the seat 19 increases as compared with the height of the seat 19 before the movement of the upper-side end support member 270 relative to the base member 260 (that is, the vehicle height increases).

When the front-wheel passage switch unit 300 is in the third switch state or the fourth switch state, the amount of oil in the jack chamber 60 decreases. The decrease in the amount of oil causes the upper-side end support member 270 to move in the upper-side direction relative to the base member 260 of the front-wheel spring length adjustment unit 250. The movement of the upper-side end support member 270 in the upper-side direction relative to the base member 260 causes the spring length of the front-wheel spring 500 to increase. The increased spring length of the front-wheel spring 500 causes the spring force of the front-wheel spring 500 in pressing the upper-side end support member 270 to reduce as compared with the spring force before the movement of the upper-side end support member 270 relative to the base member 260. This causes the preset load (pre-load) to decrease, and the amount of depression of the front fork 21 is larger when the same amount of force acts in the axial direction from the body frame 11 (seat 19) side. Thus, when the spring length of the front-wheel spring 500 is increased due to the movement of the upper-side end support member 270 in the upper-side direction relative to the base member 260, the height of the seat 19 decreases as compared with the height of the seat 19 before the movement of the upper-side end support member 270 relative to the base member 260 (that is, the vehicle height decreases). When the front-wheel passage switch unit 300 is in the fourth switch state, the amount of the oil in the jack chamber 60 decreases more quickly than when the front-wheel passage switch unit 300 is in the third switch state, as described above. Hence, when the front-wheel passage switch unit 300 is in the fourth switch state, the vehicle height decreases more quickly than when the front-wheel passage switch unit 300 is in the third switch state.

When the front-wheel passage switch unit 300 is in the first switch state, the oil discharged from the pump 600 at the time of the compression stroke flows into the reservoir chamber 40, and thus the amount of oil in the jack chamber 60 does not increase or decrease. Thus, the height of the seat 19 is maintained (that is, the vehicle height is maintained).

Configuration of Rear Suspension 22

The rear suspension 22 is disposed between the body 10 and the rear wheel 3 of the motorcycle 1, and supports the rear wheel 3. The rear suspension 22 includes an axle side unit, a body side unit, and a rear-wheel spring 502 (see FIG. 1). The axle side unit is mounted on the axle of the rear wheel 3. The body side unit is mounted on the body 10. The rear-wheel spring 502 is disposed between the axle side unit and the body side unit, and absorbs vibrations transmitted to the rear wheel 3 caused by the roughness of the ground surface. The rear-wheel spring 502 has an upper-side end supported on the body side unit and has a lower-side end supported on the axle side unit.

The axle side unit includes an attenuation force generation unit, a rod 152 (see FIG. 1), and a spring lower-side end support member 153 (see FIG. 1). The attenuation force generation unit generates attenuation force utilizing viscous resistance of oil. The rod 152 holds the attenuation force generation unit. The spring lower-side end support member 153 supports the lower-side end of the rear-wheel spring 502.

The body side unit includes a cylinder 232 (see FIG. 1), a rear-wheel spring length adjustment unit 252 (see FIG. 1), and a rear-wheel passage switch unit 302 (see FIG. 1). The attenuation force generation unit is inserted in the cylinder 232. The rear-wheel spring length adjustment unit 252 supports an upper-side end of the rear-wheel spring 502 to adjust (change) a length of the rear-wheel spring 502. The rear-wheel passage switch unit 302 is mounted outside of the cylinder 232 to switch among the passages of the oil.

The rear suspension 22 also includes a reservoir chamber (which is the storage chamber) and a pump. The reservoir chamber stores the oil. The pump includes the cylinder 232. When a relative distance between the body 10 and the rear wheel 3 increases, the pump takes into the cylinder 232 the oil stored in the reservoir chamber. When the relative distance between the body 10 and the rear wheel 3 decreases, the pump discharges the oil out of the cylinder 232.

Similarly to the front-wheel spring length adjustment unit 250 of the front fork 21, the rear-wheel spring length adjustment unit 252 includes a base member 253 (see FIG. 1) and an upper-side end support member 254 (see FIG. 1). The base member 253 is secured to a side of the body frame 11. The upper-side end support member 254 supports an upper-side end of the rear-wheel spring 502 and moves in the axial direction relative to the base member 253 so as to change the length of the rear-wheel spring 502. The rear-wheel spring length adjustment unit 252 includes a jack chamber (which is the accommodation chamber) that accommodates the oil. The upper-side end support member 254 supports the upper-side end of the rear-wheel spring 502. The rear-wheel spring length adjustment unit 252 adjusts the length of the rear-wheel spring 502 in accordance with an amount of the oil in the jack chamber.

The rear suspension 22 also includes a rear-wheel relative position detector 282 (see FIG. 12) to detect a position, relative to the body frame 11, of the member that supports the upper-side end of the rear-wheel spring 502. In a non-limiting embodiment, the rear-wheel relative position detector 282 detects an amount of displacement of the upper-side end support member 254 in the axial direction relative to the base member 253, that is, an amount of displacement of the upper-side end support member 254 in the axial direction relative to the body frame 11. In a non-limiting embodiment, a coil is wound around an outer surface of the base member 253, and the upper-side end support member 254 is made of magnetic material. Based on an impedance of the coil, which changes in accordance with displacement of the upper-side end support member 254 in the vertical direction relative to the base member 253, the rear-wheel relative position detector 282 detects an amount of displacement of the upper-side end support member 254.

Communication Passages Open or Closed in Accordance With Switch State Selected by Rear-Wheel Passage Switch Unit 302

The rear-wheel passage switch unit 302 has a configuration and functions similar to the configuration and functions of the front-wheel passage switch unit 300 of the front fork 21. Specifically, the rear-wheel passage switch unit 302 includes a first communication passage R1, a second communication passage R2, and a third communication passage R3. The first communication passage R1 allows the inside of the cylinder 232 and the reservoir chamber to communicate with each other. The second communication passage R2 allows the inside of the cylinder 232 and the jack chamber to communicate with each other. The third communication passage R3 allows the jack chamber and the reservoir chamber to communicate with each other. The rear-wheel passage switch unit 302 also includes a first communication passage switch valve V1, a second communication passage switch valve V2, and a third communication passage switch valve V3. The first communication passage switch valve V1 opens and closes the first communication passage R1. The second communication passage switch valve V2 opens and closes the second communication passage R2. The third communication passage switch valve V3 opens and closes the third communication passage R3.

When the current supplied to the rear-wheel passage switch unit 302 is less than a predetermined first reference current, the rear-wheel passage switch unit 302 opens the first communication passage R1 and closes the third communication passage R3. When the current supplied to the rear-wheel passage switch unit 302 is equal to or higher than the first reference current and less than a second reference current, the rear-wheel passage switch unit 302 closes the first communication passage R1 and the third communication passage R3. When the current supplied to the rear-wheel passage switch unit 302 is equal to or higher than the second reference current, the rear-wheel passage switch unit 302 opens the third communication passage R3 and closes the first communication passage R1.

Specifically, when the current supplied to the rear-wheel passage switch unit 302 is less than the predetermined first reference current, the rear-wheel passage switch unit 302 allows the inside of the cylinder 232 and the reservoir chamber to communicate with each other to guide the oil discharged from the pump into the reservoir chamber. When the current supplied to the rear-wheel passage switch unit 302 is equal to or higher than the first reference current and less than the second reference current, the rear-wheel passage switch unit 302 allows the inside of the cylinder 232 and the jack chamber to communicate with each other to guide the oil discharged from the pump into the jack chamber. When the current supplied to the rear-wheel passage switch unit 302 is equal to or higher than the second reference current, the rear-wheel passage switch unit 302 allows the jack chamber and the reservoir chamber to communicate with each other to guide the oil accommodated in the jack chamber into the reservoir chamber.

More specifically, when the current supplied to a coil of a rear-wheel solenoid of the rear-wheel passage switch unit 302 is less than the first reference current, the rear-wheel passage switch unit 302 is in a first switch state, in which the first communication passage switch valve V1 is open and the third communication passage switch valve V3 is closed. This causes the oil discharged from the pump to reach the reservoir chamber through the first communication passage R1. In this case, since the oil discharged from the pump does not have such a high pressure as to open the second communication passage switch valve V2, the oil does not flow through the second communication passage R2. In other words, since the first communication passage switch valve V1 is open, the second communication passage switch valve V2 is closed. In the first switch state, the oil in the jack chamber does not increase nor decrease, and consequently, the vehicle height remains unchanged.

When the current supplied to the coil of the rear-wheel solenoid of the rear-wheel passage switch unit 302 is equal to or higher than the first reference current and less than the second reference current, the rear-wheel passage switch unit 302 is in a second switch state, in which the first communication passage switch valve V1 and the third communication passage switch valve V3 are closed. This causes the oil discharged from the pump to open the second communication passage switch valve V2 and reach the jack chamber. In the second switch state, the amount of oil in the jack chamber increases to increase the vehicle height.

When the current supplied to the coil of the rear-wheel solenoid of the rear-wheel passage switch unit 302 is equal to or higher than the second reference current and less than the third reference current, the rear-wheel passage switch unit 302 is in a third switch state, in which the first communication passage switch valve V1 is closed and the third communication passage switch valve V3 is open. This causes the oil in the jack chamber to reach the reservoir chamber through the third communication passage R3. In the third switch state, the amount of oil in the jack chamber decreases to decrease the vehicle height.

When the current supplied to the coil of the rear-wheel solenoid of the rear-wheel passage switch unit 302 is equal to or higher than the third reference current, the rear-wheel passage switch unit 302 is in a fourth switch state, in which the first communication passage switch valve V1 is closed and the fourth communication passage switch valve V4 is open. This causes the oil in the jack chamber to reach the reservoir chamber through the fourth communication passage R4. In the fourth switch state, the amount of oil in the jack chamber decreases more quickly to decrease the vehicle height more quickly than in the third switch state.

Configuration of Controller 70

The controller 70 will be described below.

Figure 12:
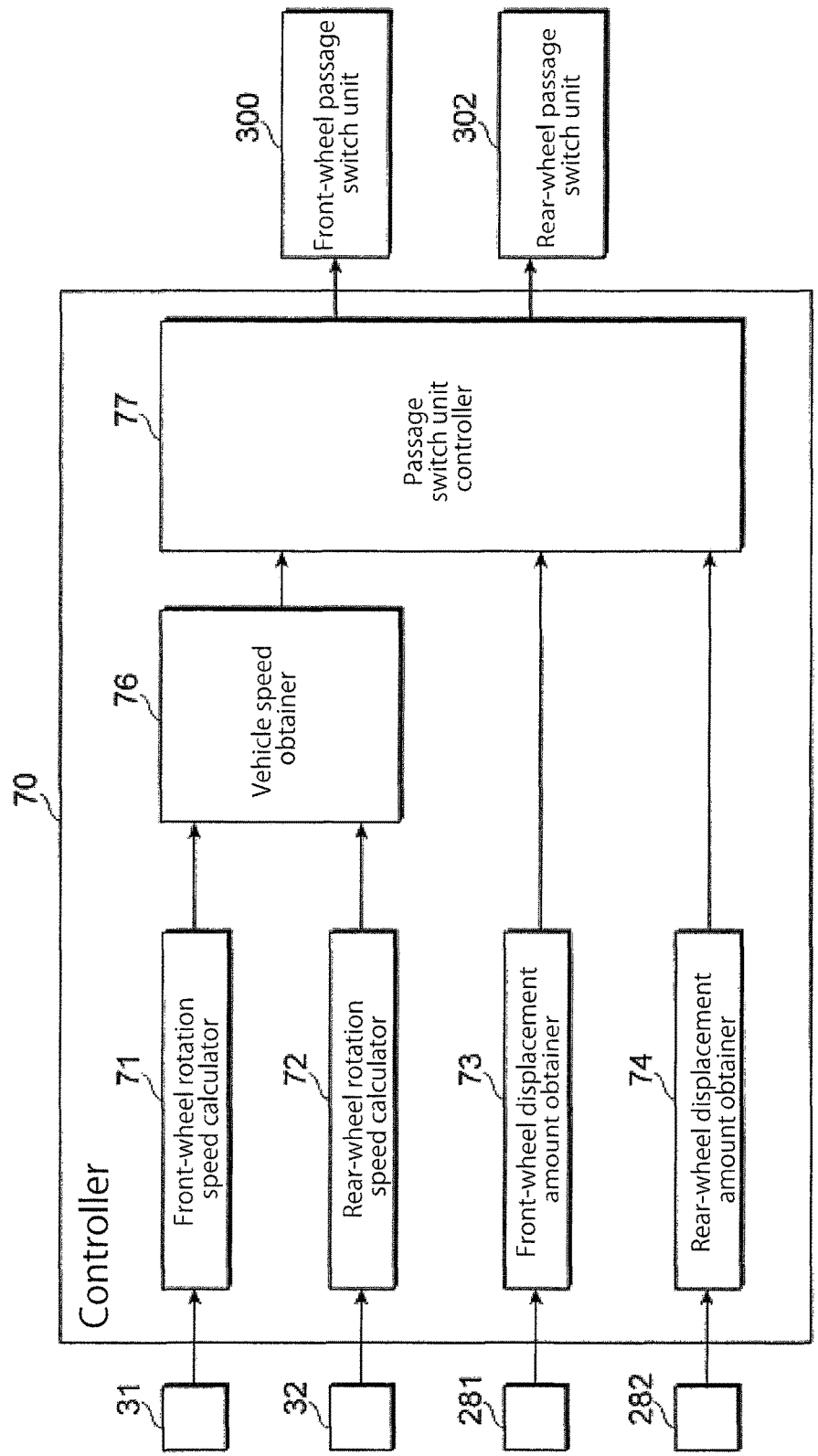
FIG. 12 is a block diagram of a controller.

FIG. 12 is a block diagram of the controller 70.

The controller 70 includes a CPU, a ROM, and a RAM. The ROM stores programs to be executed in the CPU and various kinds of data. The RAM is used as, for example, an operation memory for the CPU. The controller 70 receives inputs such as signals output from the front-wheel rotation detection sensor 31, the rear-wheel rotation detection sensor 32, the front-wheel relative position detector 281, and the rear-wheel relative position detector 282. It is noted that the front-wheel relative position detector 281 and the rear-wheel relative position detector 282 are examples of the detector to detect a relative position.

The controller 70 includes a front-wheel rotation speed calculator 71 and a rear-wheel rotation speed calculator 72. The front-wheel rotation speed calculator 71 calculates the rotation speed of the front wheel 2 based on an output signal from the front-wheel rotation detection sensor 31. The rear-wheel rotation speed calculator 72 calculates the rotation speed of the rear wheel 3 based on an output signal from the rear-wheel rotation detection sensor 32. The front-wheel rotation speed calculator 71 and the rear-wheel rotation speed calculator 72 each obtain a rotation angle based on a pulse signal, which is the output signal from the sensor, and differentiate the rotation angle by time elapsed so as to calculate the rotation speed.

The controller 70 includes a front-wheel displacement amount obtainer 73. The front-wheel displacement amount obtainer 73 obtains a front-wheel displacement amount Lf based on the output signal from the front-wheel relative position detector 281. The front-wheel displacement amount Lf is the amount of displacement of the upper-side end support member 270 of the front-wheel spring length adjustment unit 250 relative to the base member 260. The controller 70 also includes a rear-wheel displacement amount obtainer 74. The rear-wheel displacement amount obtainer 74 obtains a rear-wheel displacement amount Lr based on the output signal from the rear-wheel relative position detector 282. The rear-wheel displacement amount Lr is the amount of displacement of the upper-side end support member 254 of the rear-wheel spring length adjustment unit 252 relative to the base member 253. The front-wheel displacement amount obtainer 73 obtains the front-wheel displacement amount Lf based on a correlation between the impedance of the coil and the front-wheel displacement amount Lf. The rear-wheel displacement amount obtainer 74 obtains the rear-wheel displacement amount Lr based on a correlation between the impedance of the coil and the rear-wheel displacement amount Lr. The correlations are stored in the ROM in advance.

The controller 70 also includes a vehicle speed obtainer 76 to obtain a vehicle speed Vv, which is a traveling speed of the motorcycle 1, based on the rotation speed of the front wheel 2 calculated by the front-wheel rotation speed calculator 71 and/or based on the rotation speed of the rear wheel 3 calculated by the rear-wheel rotation speed calculator 72. The vehicle speed obtainer 76 uses the front-wheel rotation speed Rf or the rear-wheel rotation speed Rr to calculate the traveling speed of the front wheel 2 or the rear wheel 3 so as to obtain the vehicle speed Vv. The traveling speed of the front wheel 2 is calculated using the front-wheel rotation speed Rf and the outer diameter of the tire of the front wheel 2. The moving speed of the rear wheel 3 is calculated using the rear-wheel rotation speed Rr and the outer diameter of the tire of the rear wheel 3. When the motorcycle 1 is traveling in a normal state, it can be construed that the vehicle speed Vv is equal to the traveling speed of the front wheel 2 and/or the traveling speed of the rear wheel 3. Alternatively, the vehicle speed obtainer 76 may use an average value of the front-wheel rotation speed Rf and the rear-wheel rotation speed Rr to calculate an average traveling speed of the front wheel 2 and the rear wheel 3 so as to obtain the vehicle speed Vv.

The controller 70 also includes a passage switch unit controller 77 to control the switch states of the front-wheel passage switch unit 300 and the switch states of the rear-wheel passage switch unit 302 based on the vehicle speed Vv obtained by the vehicle speed obtainer 76. The passage switch unit controller 77 will be detailed later.

The front-wheel rotation speed calculator 71, the rear-wheel rotation speed calculator 72, the front-wheel displacement amount obtainer 73, the rear-wheel displacement amount obtainer 74, the vehicle speed obtainer 76, and the passage switch unit controller 77 are implemented by the CPU executing software stored in storage areas of, for example, the ROM.

The passage switch unit controller 77 of the controller 70 will now be described in detail.

Figure 13:
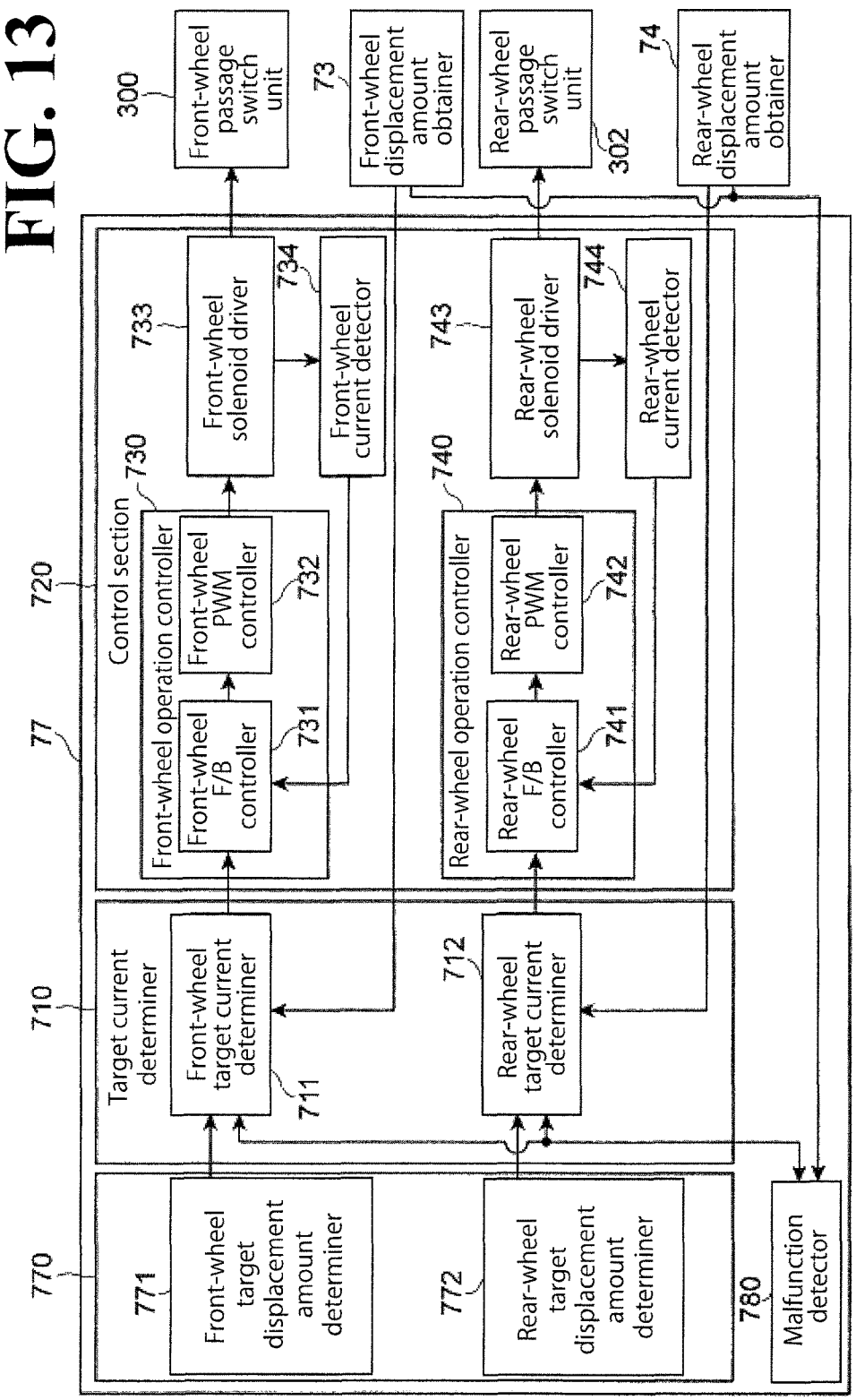
FIG. 13 is a block diagram of a passage switch unit controller.

FIG. 13 is a block diagram of the passage switch unit controller 77.

The passage switch unit controller 77 includes a target displacement amount determiner 770. The target displacement amount determiner 770 includes a front-wheel target displacement amount determiner 771 and a rear-wheel target displacement amount determiner 772. The front-wheel target displacement amount determiner 771 determines a front-wheel target displacement amount, which is a target value of the front-wheel displacement amount Lf. The rear-wheel target displacement amount determiner 772 determines a rear-wheel target displacement amount, which is a target value of the rear-wheel displacement amount Lr. The passage switch unit controller 77 also includes a target current determiner 710 and a control section 720. The target current determiner 710 determines a target current to be supplied to the front-wheel solenoid 310 of the front-wheel passage switch unit 300 and the rear-wheel solenoid (not illustrated) of the rear-wheel passage switch unit 302. The control section 720 performs control such as feedback control based on the target current determined by the target current determiner 710. The passage switch unit controller 77 further includes a malfunction detector 780. The malfunction detector 780 is an example of the malfunction detector to detect a malfunction that causes continuation of control to increase the vehicle height.

The target displacement amount determiner 770 determines a target displacement amount based on the vehicle speed Vv obtained by the vehicle speed obtainer 76 and based on which control position a vehicle height adjustment switch (not illustrated) of the motorcycle 1 occupies. The vehicle height adjustment switch is what is called a dial switch. The rider of the motorcycle 1 turns the dial of the switch to select between "Low", "Medium", and "High". The vehicle height adjustment switch is disposed in the vicinity of the speedometer, for example.

After the motorcycle 1 starts traveling, when the vehicle speed Vv obtained by the vehicle speed obtainer 76 is lower than a predetermined upward vehicle speed Vu, the target displacement amount determiner 770 determines the target displacement amount as zero. When the vehicle speed Vv changes from the value lower than the upward vehicle speed Vu to a value equal to or higher than the upward vehicle speed Vu, the target displacement amount determiner 770 determines the target displacement amount at a predetermined value in accordance with the control position of the vehicle height adjustment switch. More specifically, when the vehicle speed Vv changes from the value lower than the upward vehicle speed Vu to a value equal to or higher than the upward vehicle speed Vu, the front-wheel target displacement amount determiner 771 determines the front-wheel target displacement amount as a predetermined front-wheel target displacement amount Lf0 in accordance with the control position of the vehicle height adjustment switch.

When the vehicle speed Vv changes from the value lower than the upward vehicle speed Vu to a value equal to or higher than the upward vehicle speed Vu, the rear-wheel target displacement amount determiner 772 determines the rear-wheel target displacement amount as a predetermined rear-wheel target displacement amount Lr0 in accordance with the control position of the vehicle height adjustment switch. Then, while the vehicle speed Vv obtained by the vehicle speed obtainer 76 is equal to or higher than the upward vehicle speed Vu, the front-wheel target displacement amount determiner 771 determines the front-wheel target displacement amount as the predetermined front-wheel target displacement amount Lf0, and the rear-wheel target displacement amount determiner 772 determines the rear-wheel target displacement amount as the predetermined rear-wheel target displacement amount Lr0. The ROM stores, in advance, relationships of the control positions of the vehicle height adjustment switch, the predetermined front-wheel target displacement amount Lf0 that accords with the control position, and the predetermined rear-wheel target displacement amount Lr0 that accords with the control position. The vehicle height of the motorcycle 1 is determined in accordance with the front-wheel displacement amount Lf and the rear-wheel displacement amount Lr. In a non-limiting embodiment, a target vehicle height, which is a target value of the vehicle height of the motorcycle 1, is determined in accordance with the control position of the vehicle height adjustment switch. The predetermined front-wheel target displacement amount Lf0 and the predetermined rear-wheel target displacement amount Lr0 in accordance with the target vehicle height are determined in advance and stored in the ROM.

When the vehicle speed Vv of the motorcycle 1 changes from a value equal to or higher than the upward vehicle speed Vu to a value equal to or lower than a predetermined downward vehicle speed Vd, the target displacement amount determiner 770 determines the target displacement amount as zero. That is, the front-wheel target displacement amount determiner 771 and the rear-wheel target displacement amount determiner 772 respectively determine the front-wheel target displacement amount and the rear-wheel target displacement amount as zero. In a non-limiting example, the upward vehicle speed Vu is 7 km/h, and the downward vehicle speed Vd is 5 km/h.

The target current determiner 710 includes a front-wheel target current determiner 711 and a rear-wheel target current determiner 712. Based on the front-wheel target displacement amount determined by the front-wheel target displacement amount determiner 771, the front-wheel target current determiner 711 determines a front-wheel target current, which is a target current of the front-wheel solenoid 310 of the front-wheel passage switch unit 300. Based on the rear-wheel target displacement amount determined by the rear-wheel target displacement amount determiner 772, the rear-wheel target current determiner 712 determines a rear-wheel target current, which is a target current of the rear-wheel solenoid of the rear-wheel passage switch unit 302.

In a non-limiting embodiment, a map indicating correspondence between the front-wheel target displacement amount and the front-wheel target current is prepared based on empirical rules and stored in the ROM in advance. The front-wheel target current determiner 711 substitutes the front-wheel target displacement amount determined by the front-wheel target displacement amount determiner 771 into the map to determine the front-wheel target current.

In a non-limiting embodiment, a map indicating correspondence between the rear-wheel target displacement amount and the rear-wheel target current is prepared based on empirical rules and stored in the ROM in advance. The rear-wheel target current determiner 712 substitutes the rear-wheel target displacement amount determined by the rear-wheel target displacement amount determiner 772 into the map to determine the rear-wheel target current.

In the determination of the front-wheel target current based on the front-wheel target displacement amount determined by the front-wheel target displacement amount determiner 771, the front-wheel target current determiner 711 may perform feedback control based on an error between the front-wheel target displacement amount determined by the front-wheel target displacement amount determiner 771 and the front-wheel displacement amount Lf obtained by the front-wheel displacement amount obtainer 73 so as to determine the front-wheel target current. Similarly, in the determination of the rear-wheel target current based on the rear-wheel target displacement amount determined by the rear-wheel target displacement amount determiner 772, the rear-wheel target current determiner 712 may perform feedback control based on an error between the rear-wheel target displacement amount determined by the rear-wheel target displacement amount determiner 772 and the rear-wheel displacement amount Lr obtained by the rear-wheel displacement amount obtainer 74 so as to determine the rear-wheel target current.

The control section 720 includes a front-wheel solenoid driver 733, a front-wheel operation controller 730, and a front-wheel current detector 734. The front-wheel solenoid driver 733 drives the front-wheel solenoid 310 of the front-wheel passage switch unit 300. The front-wheel operation controller 730 controls the operation of the front-wheel solenoid driver 733. The front-wheel current detector 734 detects the current flowing to the front-wheel solenoid 310. The control section 720 also includes a rear-wheel solenoid driver 743, a rear-wheel operation controller 740, and a rear-wheel current detector 744. The rear-wheel solenoid driver 743 drives the rear-wheel solenoid. The rear-wheel operation controller 740 controls the operation of the rear-wheel solenoid driver 743. The rear-wheel current detector 744 detects the current flowing to the rear-wheel solenoid.

The front-wheel operation controller 730 includes a front-wheel feedback (F/B) controller 731 and a front-wheel PWM controller 732. The front-wheel feedback controller 731 performs feedback control based on an error between the front-wheel target current determined by the front-wheel target current determiner 711 and a current detected by the front-wheel current detector 734 (front-wheel detection current). The front-wheel PWM controller 732 performs PWM control of the front-wheel solenoid 310.

The rear-wheel operation controller 740 includes a rear-wheel feedback (F/B) controller 741 and a rear-wheel PWM controller 742. The rear-wheel feedback controller 741 performs feedback control based on an error between the rear-wheel target current determined by the rear-wheel target current determiner 712 and a current detected by the rear-wheel current detector 744 (rear-wheel detection current). The rear-wheel PWM controller 742 performs PWM control of the rear-wheel solenoid.

The front-wheel feedback controller 731 calculates an error between the front-wheel target current and the front-wheel detection current detected by the front-wheel current detector 734, and performs feedback processing to make the error zero. The rear-wheel feedback controller 741 calculates an error between the rear-wheel target current and the rear-wheel detection current detected by the rear-wheel current detector 744, and performs feedback processing to make the error zero. In a non-limiting embodiment, the front-wheel feedback controller 731 subjects the error between the front-wheel target current and the front-wheel detection current to proportional processing using a proportional element and to integral processing using an integral element, and adds these values together using an adder. The rear-wheel feedback controller 741 subjects the error between the rear-wheel target current and the rear-wheel detection current to proportional processing using a proportional element and to integral processing using an integral element, and adds these values together using an adder. In another non-limiting embodiment, the front-wheel feedback controller 731 subjects the error between the target current and the detection current to proportional processing using a proportional element, to integral processing using an integral element, and to differential processing using a differential element, and adds these values together using an adder. The rear-wheel feedback controller 741 subjects the error between the target current and the detection current to proportional processing using a proportional element, to integral processing using an integral element, and to differential processing using a differential element, and adds these values together using an adder.

The front-wheel PWM controller 732 changes a duty ratio (=t/T×100(%)) of a pulse width (t) in a predetermined cycle (T), and performs PWM control of an opening (voltage applied to the coil 311 of the front-wheel solenoid 310) of the front-wheel solenoid 310. When the PWM control is performed, the voltage is applied to the coil 311 of the front-wheel solenoid 310 in a form of a pulse that accords with the duty ratio. Here, due to the impedance of the coil 311, the current flowing to the coil 311 of the front-wheel solenoid 310 cannot change to follow the voltage applied in the form of the pulse but is output in a weakened form, and the current flowing in the coil 311 of the front-wheel solenoid 310 is increased and decreased in proportion to the duty ratio. In a non-limiting embodiment, when the front-wheel target current is zero, the front-wheel PWM controller 732 sets the duty ratio at zero. When the front-wheel target current is at its maximum, the front-wheel PWM controller 732 sets the duty ratio at 100%. In a non-limiting embodiment, when the duty ratio is set at 100%, a current of 3.2 A is controlled to flow to the coil 311 of the front-wheel solenoid 310. When the duty ratio is set at 50%, a current of 1.6 A is controlled to flow to the coil 311 of the front-wheel solenoid 310.

Similarly, the rear-wheel PWM controller 742 changes the duty ratio and performs PWM control of an opening (voltage applied to the coil of the rear-wheel solenoid) of the rear-wheel solenoid. When the PWM control is performed, the voltage is applied to the coil of the rear-wheel solenoid in a form of a pulse that accords with the duty ratio, and the current flowing in the coil of the rear-wheel solenoid is increased and decreased in proportion to the duty ratio. In a non-limiting embodiment, when the rear-wheel target current is zero, the rear-wheel PWM controller 742 sets the duty ratio at zero. When the rear-wheel target current is at its maximum, the rear-wheel PWM controller 742 sets the duty ratio at 100%. In a non-limiting embodiment, when the duty ratio is set at 100%, a current of 3.2 A is controlled to flow to the coil of the rear-wheel solenoid. When the duty ratio is set at 50%, a current of 1.6 A is controlled to flow to the coil of the rear-wheel solenoid.

The front-wheel solenoid driver 733 includes, for example, a transistor (FET). The transistor is a switching element connected between the positive electrode line of the power source and the coil 311 of the front-wheel solenoid 310. The front-wheel solenoid driver 733 drives the gate of the transistor to switch the transistor so as to control drive of the front-wheel solenoid 310. The rear-wheel solenoid driver 743 includes, for example, a transistor connected between the positive electrode line of the power source and the coil of the rear-wheel solenoid. The rear-wheel solenoid driver 743 drives the gate of the transistor to switch the transistor so as to control drive of the rear-wheel solenoid.

From voltage across the terminals of a shunt resistor connected to the front-wheel solenoid driver 733, the front-wheel current detector 734 detects the value of the current flowing to the front-wheel solenoid 310. From voltage across the terminals of a shunt resistor connected to the rear-wheel solenoid driver 743, the rear-wheel current detector 744 detects the value of the current flowing to the rear-wheel solenoid.

The malfunction detector 780 will be detailed later.

It is noted that the target current determiner 710, the control section 720, and the target displacement amount determiner 770 are examples of the vehicle height controller to control a vehicle height.

In the motorcycle 1 of the above-described configuration, the passage switch unit controller 77 of the controller 70 determines the target current based on the target vehicle height in accordance with the control position of the vehicle height adjustment switch, and performs PWM control to cause an actual current supplied to the front-wheel solenoid 310 and the rear-wheel solenoid to be the target current determined. That is, the front-wheel PWM controller 732 and the rear-wheel PWM controller 742 of the passage switch unit controller 77 change the duty ratios to control power supplied to the coil 311 of the front-wheel solenoid 310 and the coil of the rear-wheel solenoid so as to control the front-wheel solenoid 310 and the rear-wheel solenoid into desired openings.

The controller 70 of the above-described configuration cannot adjust the vehicle height appropriately when the malfunction that causes continuation of control to increase the vehicle height occurs.

FIG. 14A is a time chart illustrating a trouble when the malfunction that causes continuation of control to increase the vehicle height occurs. Although the front-wheel side is illustrated as an example in FIG. 14A, the same applies to the rear-wheel side.

When the front-wheel relative position detector 281, for example, malfunctions and starts to keep outputting a same detection value before reaching a front-wheel target displacement amount at a speed equal to or higher than the upward vehicle speed Vu (namely, the predetermined front-wheel target displacement amount Lf0), a front-wheel displacement amount Lf obtained by the front-wheel displacement amount obtainer 73 based on an output signal from the front-wheel relative position detector 281 (hereinafter referred to as "detected front-wheel displacement amount Lfd") becomes smaller than an actual front-wheel displacement amount Lf (hereinafter referred to as "actual front-wheel displacement amount Lfa"). As a result, even if the actual front-wheel displacement amount Lfa is equal to the predetermined front-wheel target displacement amount Lf0, for example, the detected front-wheel displacement amount Lfd becomes smaller than the predetermined front-wheel target displacement amount Lf0. Consequently, to increase the actual front-wheel displacement amount Lfa, the front-wheel target current determiner 711 determines as a front-wheel target current an increase current for increasing the vehicle height (equal to or higher than the first reference current and less than the second reference current). The increase current is, in other words, a current for increasing the front-wheel displacement amount Lf and the rear-wheel displacement amount Lr.

The front-wheel relative position detector 281, however, is malfunctioning and keeps outputting the same detection value. As a result, the front-wheel target current determiner 711 keeps determining the increase current as the front-wheel target current to increase the actual front-wheel displacement amount Lfa. In other words, the front-wheel target current determiner 711 continues to control to increase the vehicle height. As a result, even if the vehicle speed Vv of the motorcycle 1 is equal to or lower than the downward vehicle speed Vd, the front-wheel displacement amount Lf is not decreased, and the vehicle height is not decreased. The vehicle height is kept high even at halt of the motorcycle 1. This makes it difficult to get on and off the motorcycle 1.

Similarly, when the rear-wheel relative position detector 282, for example, malfunctions and starts outputting a same detection value before reaching a rear-wheel target displacement amount at a speed equal to or higher than the upward vehicle speed Vu (namely, the predetermined rear-wheel target displacement amount Lr0), a rear-wheel displacement amount Lr obtained by the rear-wheel displacement amount obtainer 74 based on an output signal from the rear-wheel relative position detector 282 (hereinafter referred to as "detected rear-wheel displacement amount Lrd") becomes smaller than an actual rear-wheel displacement amount Lr (hereinafter referred to as "actual rear-wheel displacement amount Lra"). As a result, even if the actual rear-wheel displacement amount Lra is equal to the predetermined rear-wheel target displacement amount Lr0, for example, the detected rear-wheel displacement amount Lrd becomes smaller than the predetermined rear-wheel target displacement amount Lr0. Consequently, to increase the actual rear-wheel displacement amount Lra, the rear-wheel target current determiner 712 determines an increase current as a rear-wheel target current.

The rear-wheel relative position detector 282, however, is malfunctioning and keeps outputting the same detection value. As a result, the rear-wheel target current determiner 712 keeps determining the increase current as the rear-wheel target current to increase the actual rear-wheel displacement amount Lra. In other words, the rear-wheel target current determiner 712 continues to control to increase the vehicle height. As a result, even if the vehicle speed Vv of the motorcycle 1 is equal to or lower than the downward vehicle speed Vd, the rear-wheel displacement amount Lr is not decreased, and the vehicle height is not decreased. The vehicle height is kept high even at halt of the motorcycle 1. This makes it difficult to get on and off the motorcycle 1.

In this manner, as the malfunction that causes continuation of control to increase the vehicle height, the malfunction of the front-wheel relative position detector 281 and the rear-wheel relative position detector 282 may be given as an example.

Details of Malfunction Detector 780

In view of the above-described circumstances, the malfunction detector 780 according to this embodiment detects the malfunction that causes continuation of control to increase the vehicle height. When the malfunction detector 780 detects the malfunction that causes continuation of control to increase the vehicle height, the malfunction detector 780 controls the front-wheel passage switch unit 300 and the rear-wheel passage switch unit 302 by substitution control (control in accordance with the vehicle speed Vv, for example).

Control on the front-wheel side will be described in detail below. Control on the rear-wheel side, which is the same as the control on the front-wheel side, will not be elaborated here.

At an initial stage in which the motorcycle 1 starts to travel, and the vehicle speed Vv is equal to or higher than the upward vehicle speed Vu (hereinafter referred to as "upward initial stage"), when a period of time in which a change amount of a detected front-wheel displacement amount Lfd is less than a reference amount (hereinafter referred to as "front-wheel reference change amount") is a first predetermined period of time t1 or longer, the malfunction detector 780 determines that a malfunction has occurred in the front-wheel relative position detector 281. The first predetermined period of time t1 may be, for example, 60 sec. The front-wheel reference change amount may be, for example, 0.5 mm to 2.0 mm.

At the upward initial stage, predetermined conditions concerning the detected front-wheel displacement amount Lfd, the vehicle speed Vv, and the front-wheel target current, for example, are satisfied. More specifically, the detected front-wheel displacement amount Lfd is less than a reference displacement amount (hereinafter referred to as "front-wheel reference displacement amount"). The vehicle speed Vv is equal to or higher than the upward vehicle speed Vu, which is an exemplary reference vehicle speed. The front-wheel target current is an increase current. It is noted that the front-wheel reference displacement amount may be 2 mm to 5 mm, for example.

When the malfunction detector 780 determines that a malfunction in the front-wheel relative position detector 281, that is, a malfunction that becomes a cause to continue control to increase the vehicle height, has occurred, the malfunction detector 780 lights the warning lamp and outputs to the front-wheel target current determiner 711 and the rear-wheel target current determiner 712 a command signal for performing control in accordance with the vehicle speed Vv. The control in accordance with the vehicle speed Vv is control to change the vehicle height in accordance with the vehicle speed Vv irrespective of an output signal from the front-wheel relative position detector 281 and the rear-wheel relative position detector 282.

More specifically, as the control in accordance with the vehicle speed Vv, the front-wheel target current determiner 711 sets the front-wheel target current at an increase current when the vehicle speed Vv obtained by the vehicle speed obtainer 76 is equal to or higher than a vehicle speed Vt, which is a reference of this control. Thus, the vehicle height of the motorcycle 1 increases to reach the upper-limit height. When the vehicle height reaches the upper-limit height, the front-wheel target current determiner 711 sets the front-wheel target current at a maintenance current (equal to or higher than zero and less than the first reference current) to maintain the vehicle height. In order to make a determination as to whether the vehicle height reaches the upper-limit height, a maximum limit position sensor (not illustrated), for example, may be provided to optically or mechanically determine that the vehicle height reaches the upper-limit height.

Meanwhile, the front-wheel target current determiner 711 sets the front-wheel target current at a decrease current (equal to or higher than the second reference current) when the vehicle speed Vv obtained by the vehicle speed obtainer 76 is less than the vehicle speed Vt. Thus, the vehicle height of the motorcycle 1 decreases to reach the lower-limit height. When the vehicle height reaches the lower-limit height, the front-wheel target current determiner 711 sets the front-wheel target current at the maintenance current. In order to make a determination as to whether the vehicle height reaches the lower-limit height, a minimum limit position sensor (not illustrated), for example, may be provided to optically or mechanically determine that the vehicle height reaches the lower-limit height.

FIG. 14B is a time chart illustrating how the malfunction detector 780 according to this embodiment controls. In FIG. 14B, control on the front-wheel side is illustrated as an example. The same, however, applies to the rear-wheel side.

When the malfunction detector 780 determines that the motorcycle 1 is at the upward initial stage, the malfunction detector 780 starts malfunction determination of the front-wheel relative position detector 281. In the malfunction determination, the front-wheel displacement amount Lf is divided into sections (ranges) by intervals of the front-wheel reference change amount in advance. The malfunction detector 780 measures time (hereinafter referred to as "remaining time") in which the detected front-wheel displacement amount Lfd remains in each of the sections divided by the intervals of the front-wheel reference change amount. When the remaining time is less than the first predetermined period of time t1, it is not determined as a malfunction. Meanwhile, when the remaining time in one of the plurality of sections is equal to or longer than the first predetermined period of time t1, the malfunction detector 780 determines that a malfunction in the front-wheel relative position detector 281 that causes continuation of control to increase the vehicle height has occurred. Then, the malfunction detector 780 outputs a command signal to control in accordance with the vehicle speed Vv to the front-wheel target current determiner 711 and the rear-wheel target current determiner 712.

Alternatively, the malfunction detector 780 may perform the following malfunction determination. FIG. 14C is a time chart illustrating another example of how the malfunction detector 780 according to this embodiment controls.

In this malfunction determination, the malfunction detector 780 preserves a value of the detected front-wheel displacement amount Lfd obtained from the front-wheel displacement amount obtainer 73. Then, the malfunction detector 780 makes a determination as to whether a change amount of the detected front-wheel displacement amount Lfd in the first predetermined period of time t1 from the present time is less than the front-wheel reference change amount. When the change amount of the detected front-wheel displacement amount Lfd in the first predetermined period of time t1 is less than the front-wheel reference change amount, the malfunction detector 780 determines that a malfunction in the front-wheel relative position detector 281 that causes continuation of control to increase the vehicle height has occurred. Then, the malfunction detector 780 outputs a command signal to control in accordance with the vehicle speed Vv to the front-wheel target current determiner 711 and the rear-wheel target current determiner 712.

Next, using a flowchart, a procedure of control processing performed by the malfunction detector 780 will be described.

Figure 15:
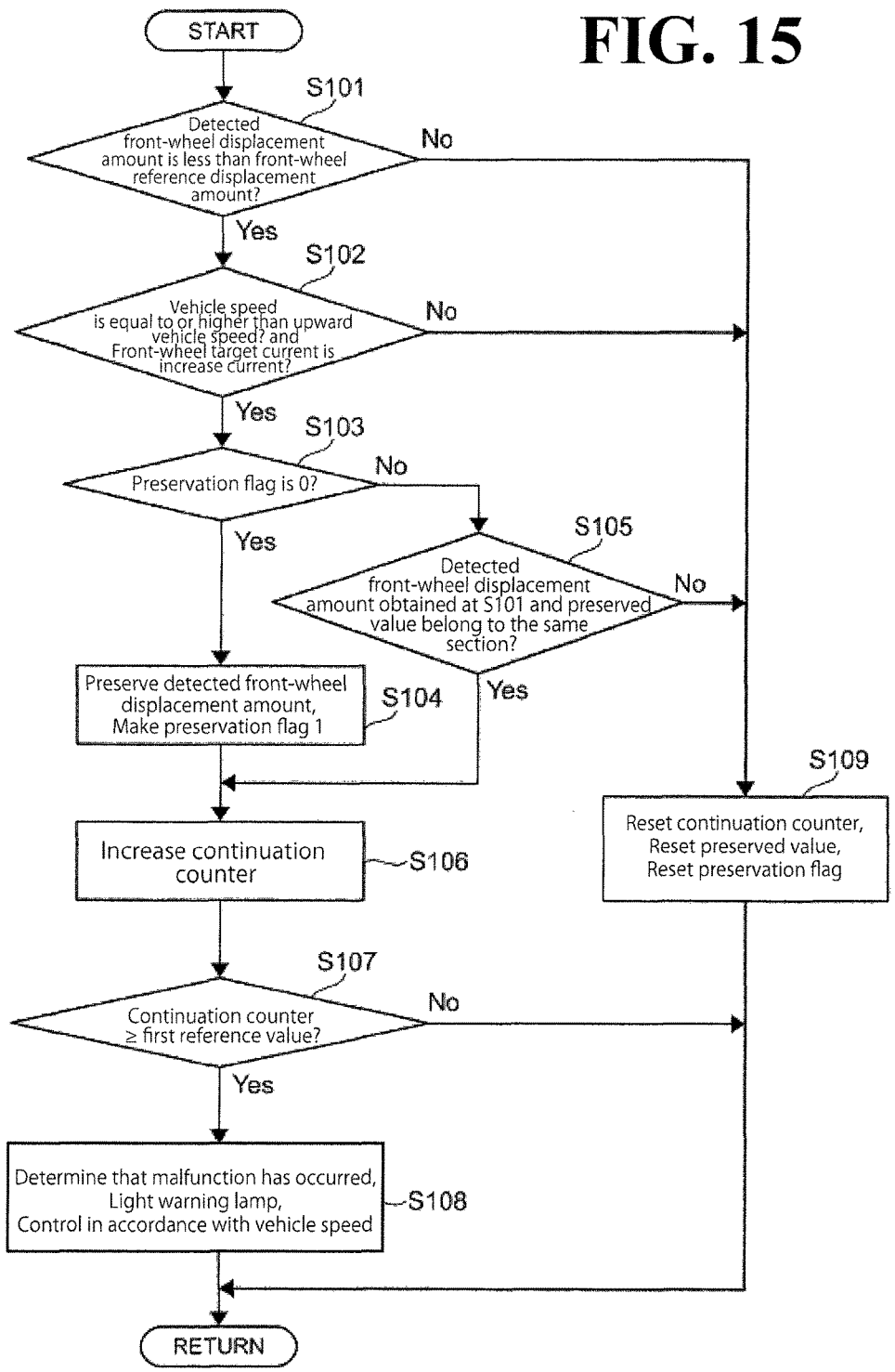
FIG. 15 is a flowchart of a procedure for control processing performed by the malfunction detector.
Figure 16:
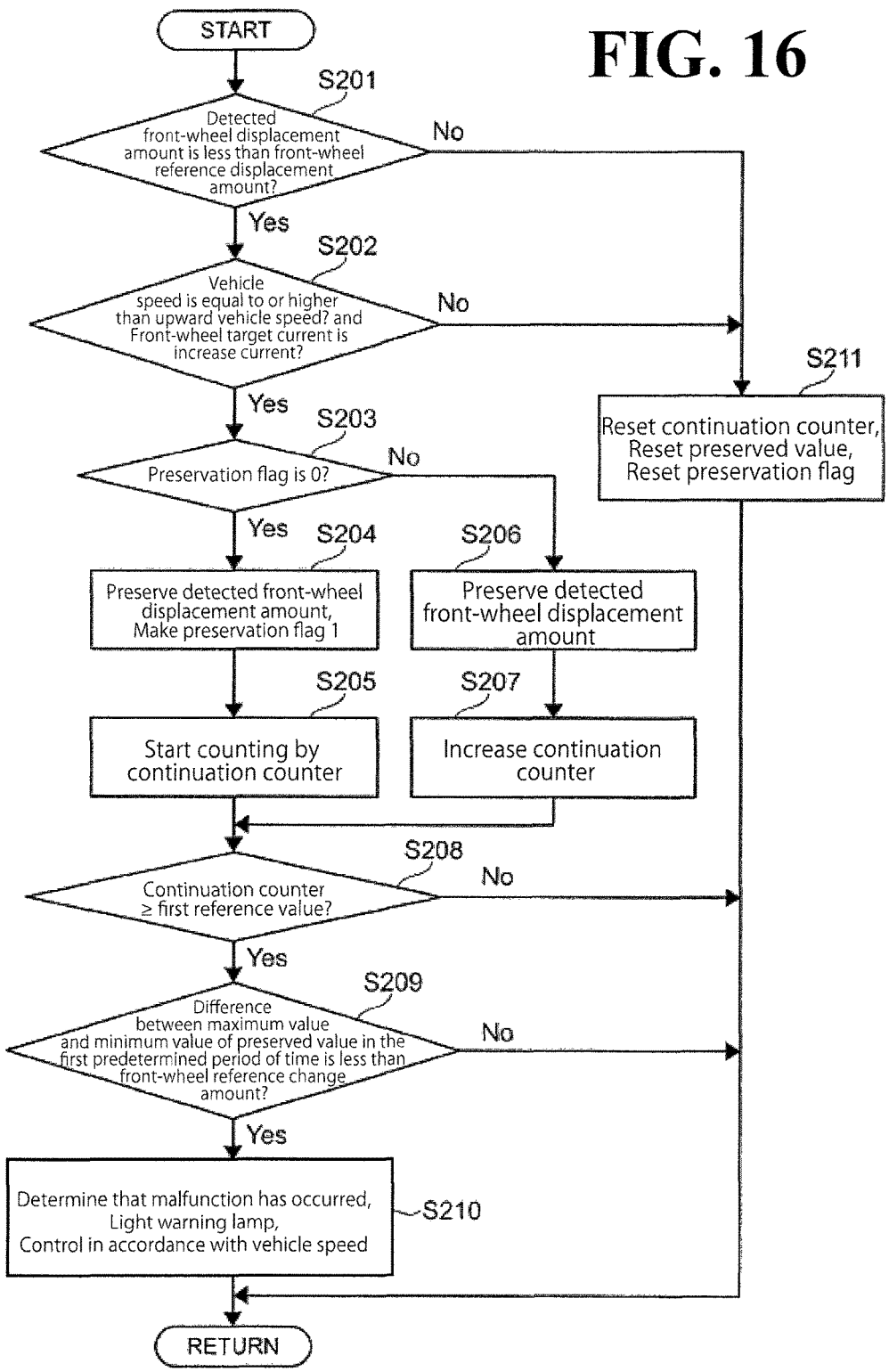
FIG. 16 is a flowchart of a procedure for control processing performed by the malfunction detector.

FIGS. 15 and 16 are flowcharts illustrating procedures of control processing performed by the malfunction detector 780. FIG. 15 illustrates a case in which the remaining time in one of the sections is equal to or longer than the first predetermined period of time t1, as illustrated in FIG. 14B. FIG. 16 illustrates a case in which the change amount of the detected front-wheel displacement amount Lfd in the first predetermined period of time t1 is less than the front-wheel reference change amount, as illustrated in FIG. 14C.

Although the malfunction detector 780 detects the malfunction that causes continuation of control to increase the vehicle height, as described above, control processing for detecting a malfunction in the front-wheel relative position detector 281 will be described below as an example. Control processing for detecting a malfunction in the rear-wheel relative position detector 282 as the malfunction that causes continuation of control to increase the vehicle height, which is the same as the control processing for detecting the malfunction in the front-wheel relative position detector 281, will not be elaborated here.

The malfunction detector 780 repeatedly performs this control processing for every predetermined period of time (1 msec, for example).

First, the example illustrated in FIG. 15 will be described.

The malfunction detector 780 makes a determination as to whether a detected front-wheel displacement amount Lfd is less than a front-wheel reference displacement amount (S101). When the detected front-wheel displacement amount Lfd is less than the front-wheel reference displacement amount (Yes at S101), the malfunction detector 780 makes a determination as to whether a vehicle speed Vv is equal to or higher than the upward vehicle speed Vu and whether a front-wheel target current is an increase current (S102).

When the vehicle speed Vv is equal to or higher than the upward vehicle speed Vu and when the front-wheel target current is the increase current (Yes at S102), the malfunction detector 780 starts malfunction determination. Then, the malfunction detector 780 makes a determination as to whether a preservation flag is 0 (S103). This preservation flag is a value set in the RAM, and its initial value is 0. The preservation flag is set at 1 at S104, described later.

When the preservation flag is 0 (Yes at S103), the malfunction detector 780 preserves the value of the detected front-wheel displacement amount Lfd obtained at S101, and makes the preservation flag 1 and sets it in the RAM (S104). Meanwhile, when the preservation flag is 1 (No at S103), the malfunction detector 780 makes a determination as to whether the detected front-wheel displacement amount Lfd obtained at S101 and the preserved value of the detected front-wheel displacement amount Lfd belong to the same section among the sections divided by the intervals of the front-wheel reference change amount (S105).

When the detected front-wheel displacement amount Lfd obtained at S101 and the preserved value of the detected front-wheel displacement amount Lfd belong to the same section at S105 (Yes at S105) or after S104, the malfunction detector 780 increases a continuation counter (S106). Next, the malfunction detector 780 makes a determination as to whether the continuation counter is equal to or longer than a first reference value, which is determined in advance as a value equivalent to the first predetermined period of time t1 (S107). This is processing for determining whether the remaining time in the section among the sections divided by the intervals of the front-wheel reference change amount is equal to or longer than the first predetermined period of time t1.

When the continuation counter is equal to or longer than the predetermined first reference value (Yes at S107), the malfunction detector 780 determines that the malfunction in the front-wheel relative position detector 281 that causes continuation of control to increase the vehicle height has occurred. Then, the malfunction detector 780 lights the warning lamp, and outputs a command signal to control in accordance with the vehicle speed Vv to the front-wheel target current determiner 711 and the rear-wheel target current determiner 712 (S108). Meanwhile, when the continuation counter is less than the predetermined first reference value at S107 (No at S107), the malfunction detector 780 ends performance of the control processing.

When the detected front-wheel displacement amount Lfd obtained at S101 and the preserved value of the detected front-wheel displacement amount Lfd do not belong to the same section (No at S105), it is not determined as a malfunction. This is because the detected front-wheel displacement amount Lfd enters a different section before the remaining time is equal to or longer than the first predetermined period of time t1. The malfunction detector 780 resets the continuation counter and resets the preserved value of the detected front-wheel displacement amount Lfd. Moreover, the malfunction detector 780 resets the preservation flag (makes the preservation flag 0) (S109).

When the detected front-wheel displacement amount Lfd is equal to or larger than the front-wheel reference displacement amount at S101 (No at S101), the malfunction detector 780 does not perform malfunction determination and proceeds to S109. When the vehicle speed Vv is less than the upward vehicle speed Vu or when the front-wheel target current is not the increase current at S102 (No at S102), the malfunction detector 780 does not perform malfunction determination and proceeds to S109.

Next, the example illustrated in FIG. 16 will be described.

Processing at S201 to S203, which is the same as the processing at S101 to S103 in FIG. 15, will not be elaborated here.

When the preservation flag is 0 at S203 (Yes at S203), the malfunction detector 780 preserves the value of the detected front-wheel displacement amount Lfd obtained at S201, makes the preservation flag 1, and sets it in the RAM (S204). Then, the malfunction detector 780 starts counting by the continuation counter (S205). Meanwhile, when the preservation flag is 1 at S203 (No at S203), the malfunction detector 780 preserves the value of the detected front-wheel displacement amount Lfd (S206). When the preservation flag is 1, counting by the continuation counter has been already started, and the malfunction detector 780 increases the continuation counter (S207).

Next, the malfunction detector 780 makes a determination as to whether the continuation counter is equal to or longer than the first reference value, which is determined in advance as a value equivalent to the first predetermined period of time t1 (S208). This is processing for determining whether a period of time in which the conditions illustrated in S201 to S203 are satisfied is equal to or longer than the first predetermined period of time t1.

When the continuation counter is less than the first reference value (No at S208), the malfunction detector 780 ends performance of this control processing. Meanwhile, when the continuation counter is equal to or longer than the first reference value (Yes at S208), the malfunction detector 780 makes a determination as to whether a difference between a maximum value and a minimum value of the detected front-wheel displacement amount Lfd preserved in the first predetermined period of time t1 from the present time is less than the front-wheel reference change amount (S209).

When the difference between the maximum value and the minimum value of the preserved detected front-wheel displacement amount Lfd is less than the front-wheel reference change amount (Yes at S209), the malfunction detector 780 determines that a malfunction in the front-wheel relative position detector 281 that causes continuation of control to increase the vehicle height has occurred. Then, the malfunction detector 780 lights the warning lamp and outputs a command signal to control in accordance with the vehicle speed Vv to the front-wheel target current determiner 711 and the rear-wheel target current determiner 712 (S210). Meanwhile, when the difference between the maximum value and the minimum value of the preserved detected front-wheel displacement amount Lfd is equal to or larger than the front-wheel reference change amount at S209, the malfunction detector 780 ends performance of this control processing.

When the detected front-wheel displacement amount Lfd is equal to or larger than the front-wheel reference displacement amount at S201 (No at S201), malfunction determination is not performed, and the malfunction detector 780 resets the continuation counter and resets the preserved value of the detected front-wheel displacement amount Lfd. Further, the malfunction detector 780 resets the preservation flag (makes the preservation flag 0) (S211). When the vehicle speed Vv is less than the upward vehicle speed Vu or when the front-wheel target current is not the increase current at S202 (No at S202), the malfunction detector 780 does not perform malfunction determination and proceeds to S211.

The malfunction detector 780 of the above-described configuration detects the malfunction that causes continuation of control to increase the vehicle height based on the change amount of the detection value detected by the front-wheel relative position detector 281 and the rear-wheel relative position detector 282. When the malfunction is detected, the control in accordance with the vehicle speed Vv is performed as the substitution control. Thus, the vehicle height is controlled in accordance with the vehicle speed Vv of the motorcycle 1. This prevents the vehicle height from being kept high even at halt of the motorcycle 1 and causing difficulty in getting on and off the motorcycle 1, for example.

In the above-described embodiment, when the malfunction that causes continuation of control to increase the vehicle height is detected, the control in accordance with the vehicle speed Vv is performed as the substitution control. This, however, should not be construed in a limiting sense. Instead of the control in accordance with the vehicle speed Vv, the malfunction detector 780 may perform such control that the front-wheel passage switch unit 300 and the rear-wheel passage switch unit 302 shift to the first switch state, for example. When the front-wheel passage switch unit 300, for example, is controlled to be in the first switch state, the front-wheel target current is set at a maintenance current to maintain the vehicle height.

Here, when the malfunction detector 780 detects the malfunction, instead of making the front-wheel target current the maintenance current, the passage switch unit controller 77 may turn off (break) a front-wheel relay (not illustrated). The front-wheel relay is connected to the current path between the front-wheel solenoid driver 733 and the front-wheel solenoid 310 to turn on or off the current supplied from the front-wheel solenoid driver 733 to the front-wheel solenoid 310. Similarly, when the malfunction detector 780 detects the malfunction, instead of making the rear-wheel target current the maintenance current, the passage switch unit controller 77 may turn off (break) a rear-wheel relay (not illustrated). The rear-wheel relay is connected to the current path between the rear-wheel solenoid driver 743 and the rear-wheel solenoid to turn on or off the current supplied from the rear-wheel solenoid driver 743 to the rear-wheel solenoid.

In the above-described embodiment, the malfunction in the front-wheel relative position detector 281 and the rear-wheel relative position detector 282 is described as the malfunction that causes continuation of control to increase the vehicle height. This, however, should not be construed in a limiting sense. For example, it is also considered that a spring length of the front-wheel spring 500 and the rear-wheel spring 502 is not decreased because the front-wheel spring length adjustment unit 250 and the rear-wheel spring length adjustment unit 252 malfunction. That is, it is also considered that when the front-wheel spring length adjustment unit 250 and the rear-wheel spring length adjustment unit 252 malfunction, the actual front-wheel displacement amount Lfa and the actual rear-wheel displacement amount Lra cannot be increased. A malfunction in the front-wheel spring length adjustment unit 250 on the front-wheel side will be described in detail below as an example A malfunction in the rear-wheel spring length adjustment unit 252 on the rear-wheel side, which is the same as the malfunction on the front-wheel side, will not be elaborated here.

When the front-wheel spring length adjustment unit 250, for example, malfunctions, and when the actual front-wheel displacement amount Lfa is not increased, the detected front-wheel displacement amount Lfd is not increased, either. As a result, even when the vehicle speed Vv of the motorcycle 1 is equal to or higher than the upward vehicle speed Vu, the detected front-wheel displacement amount Lfd is not increased but become smaller than the predetermined front-wheel target displacement amount Lf0. In this case, to increase the actual front-wheel displacement amount Lfa, the front-wheel target current determiner 711 determines an increase current as the front-wheel target current. Since the front-wheel spring length adjustment unit 250 is malfunctioning, however, the detected front-wheel displacement amount Lfd is not increased even if the increase current is determined as the front-wheel target current. In this case, the front-wheel target current determiner 711 continues to determine the increase current as the front-wheel target current. In other words, the front-wheel target current determiner 711 continues to control to increase the vehicle height. In this manner, irrespective of the vehicle height, the increase current continues to flow to the coil 311 of the front-wheel solenoid 310. This unfortunately causes the coil 311 to generate heat, for example.

By the processing illustrated in FIG. 15 or 16, the malfunction detector 780 according to this embodiment can also detect the malfunction in the front-wheel spring length adjustment unit 250 that causes continuation of control to increase the vehicle height. In other words, as the malfunction that causes continuation of control to increase the vehicle height, the malfunction detector 780 can detect the malfunction in the front-wheel relative position detector 281 and the rear-wheel relative position detector 282 or the malfunction in the front-wheel spring length adjustment unit 250 and the rear-wheel spring length adjustment unit 252, for example.

Each of the front-wheel passage switch unit 300 and the rear-wheel passage switch unit 302 controls, as a single unit, three control modes in accordance with the amount of the current. The three control modes are: increasing mode for increasing the vehicle height, decreasing mode for decreasing the vehicle height, and maintenance mode for maintaining the vehicle height. In the above-described embodiment, the control performed by the malfunction detector 780 is applied to the front-wheel passage switch unit 300 and the rear-wheel passage switch unit 302 to control the three control modes as a single unit. Application of the control performed by the malfunction detector 780, however, should not be limited to the unit to control the three control modes as a single unit. The control may be applied to a configuration in which the three control modes are implemented by two control valves (electromagnetic actuators).

In vehicle height adjustment devices, it is considered that a changer (electromagnetic actuator, for example) to adjust the height of the motorcycle is controlled based on a detection value detected by a detector to detect the height of the motorcycle. In this configuration, when such a malfunction occurs in the detector that a detection value is lower than an actual height of the motorcycle, for example, the detector outputs the detection value lower than a target height of the motorcycle even if the actual height of the motorcycle is equal to the target height. Consequently, a controller to control the changer controls the changer to increase the height of the motorcycle. Although the height of the motorcycle is actually increasing, the detector outputs the detection value lower than the actual height of the motorcycle. This makes the controller continue to control to increase the height of the motorcycle. When the controller continues to control to increase the height of the motorcycle in this manner, the height of the motorcycle is kept high even at halt of the motorcycle and makes it difficult for the rider to get on and off the motorcycle. In view of this, it is of great significance to detect the malfunction that causes continuation of control to increase the height of the motorcycle.

In a non-limiting embodiment, the malfunction in the changer may be such a malfunction that the changer is unable to increase the relative position.

In a non-limiting embodiment, the malfunction in the detector may be such a malfunction that the detector keeps outputting a same detection value irrespective of an actual relative position.

In a non-limiting embodiment, the malfunction detector may be configured to detect the malfunction based on a change amount of the detection value over a predetermined period of time.

In a non-limiting embodiment, the malfunction detector may be configured to determine that the malfunction has occurred when the detection value remains in one of a plurality of ranges for a predetermined period of time, the plurality of ranges being obtained by dividing the relative position into reference time sections.

In a non-limiting embodiment, the malfunction detector may be configured to determine that the malfunction has occurred when the change amount is less than a reference change amount.

In a non-limiting embodiment, the changer may include an actuator drivable by a current to change the relative position. The vehicle height controller may include a target current determiner configured to determine, based on a target value of the relative position, a target current to be supplied to the actuator. The malfunction detector may be configured to determine whether the malfunction has occurred when: a vehicle speed, which is a traveling speed of the vehicle, is equal to or higher than a reference vehicle speed; the determined target current is an increase current to increase the relative position; and the detection value is less than a reference value.

The embodiments of the present disclosure eliminate or minimize adverse effects caused by continuation of control to increase the vehicle height.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A vehicle height adjustment device comprising:
    a changer configured to change a relative position of a body of a vehicle relative to an axle of a wheel of the vehicle;
    a vehicle height controller configured to change the relative position based on a detection value detected by a detector configured to detect the relative position so as to control a vehicle height, which is a height of the body; and
    a malfunction detector configured to detect a malfunction in at least one of the changer and the detector, the malfunction causing the vehicle height controller to continue to control the vehicle height so that it increases,
    wherein the malfunction detector is configured to detect the malfunction based on a change in an amount of the detection value over a predetermined period of time, and
    wherein the malfunction detector is configured to determine that the malfunction has occurred when the detection value remains in one of a plurality of ranges for the predetermined period of time, the plurality of ranges being obtained by dividing the relative position into reference time sections.

2. The vehicle height adjustment device according to claim 1, wherein the malfunction in the changer comprises such a malfunction that the changer is unable to increase the relative position.

3. The vehicle height adjustment device according to claim 2, wherein the malfunction detector is configured to determine that the malfunction has occurred when the change amount is less than a reference change amount.

4. The vehicle height adjustment device according to claim 3, wherein the changer comprises an actuator drivable by a current to change the relative position,
    wherein the vehicle height controller comprises a target current determiner configured to determine, based on a target value of the relative position, a target current to be supplied to the actuator, and
    wherein the malfunction detector is configured to determine whether or not the malfunction has occurred when:
        a vehicle speed, which is a traveling speed of the vehicle, is equal to or higher than a reference vehicle speed;
        the determined target current is an increase current to increase the relative position; and
        the detection value is less than a reference value.

5. The vehicle height adjustment device according to claim 2,
    wherein the changer comprises an actuator drivable by a current to change the relative position,
    wherein the vehicle height controller comprises a target current determiner configured to determine, based on a target value of the relative position, a target current to be supplied to the actuator, and
    wherein the malfunction detector is configured to determine whether or not the malfunction has occurred when:
        a vehicle speed, which is a traveling speed of the vehicle, is equal to or higher than a reference vehicle speed;
        the determined target current is an increase current to increase the relative position; and
        the detection value is less than a reference value.

6. The vehicle height adjustment device according to claim 1, wherein the malfunction in the detector comprises such a malfunction that the detector keeps outputting a same detection value irrespective of an actual relative position.

7. The vehicle height adjustment device according to claim 6, wherein the malfunction detector is configured to determine that the malfunction has occurred when the change amount is less than a reference change amount.

8. The vehicle height adjustment device according to claim 7,
    wherein the changer comprises an actuator drivable by a current to change the relative position,
    wherein the vehicle height controller comprises a target current determiner configured to determine, based on a target value of the relative position, a target current to be supplied to the actuator, and
    wherein the malfunction detector is configured to determine whether or not the malfunction has occurred when:
        a vehicle speed, which is a traveling speed of the vehicle, is equal to or higher than a reference vehicle speed;
        the determined target current is an increase current to increase the relative position; and
        the detection value is less than a reference value.

9. The vehicle height adjustment device according to claim 6,
    wherein the changer comprises an actuator drivable by a current to change the relative position,
    wherein the vehicle height controller comprises a target current determiner configured to determine, based on a target value of the relative position, a target current to be supplied to the actuator, and
    wherein the malfunction detector is configured to determine whether or not the malfunction has occurred when:
        a vehicle speed, which is a traveling speed of the vehicle, is equal to or higher than a reference vehicle speed;
        the determined target current is an increase current to increase the relative position; and
        the detection value is less than a reference value.

10. The vehicle height adjustment device according to claim 1, wherein the malfunction detector is configured to determine that the malfunction has occurred when the change amount is less than a reference change amount.

11. The vehicle height adjustment device according to claim 10,
    wherein the changer comprises an actuator drivable by a current to change the relative position,
    wherein the vehicle height controller comprises a target current determiner configured to determine, based on a target value of the relative position, a target current to be supplied to the actuator, and
    wherein the malfunction detector is configured to determine whether or not the malfunction has occurred when:
        a vehicle speed, which is a traveling speed of the vehicle, is equal to or higher than a reference vehicle speed;
        the determined target current is an increase current to increase the relative position; and
        the detection value is less than a reference value.

12. The vehicle height adjustment device according to claim 1,
wherein the changer comprises an actuator drivable by a current to change the relative position,
wherein the vehicle height controller comprises a target current determiner configured to determine, based on a target value of the relative position, a target current to be supplied to the actuator, and
wherein the malfunction detector is configured to determine whether or not the malfunction has occurred when:
a vehicle speed, which is a traveling speed of the vehicle, is equal to or higher than a reference vehicle speed;
the determined target current is an increase current to increase the relative position; and
the detection value is less than a reference value.

13. A vehicle height adjustment device comprising:
a changer configured to change a relative position of a body of a vehicle relative to an axle of a wheel of the vehicle;
a vehicle height controller configured to change the relative position based on a detection value detected by a detector configured to detect the relative position so as to control a vehicle height, which is a height of the body; and
a malfunction detector configured to detect a malfunction in at least one of the changer and the detector, the malfunction causing the vehicle height controller to continue to control the vehicle height so that it increases,
wherein the changer comprises an actuator drivable by a current to change the relative position,
wherein the vehicle height controller comprises a target current determiner configured to determine, based on a target value of the relative position, a target current to be supplied to the actuator, and
wherein the malfunction detector is configured to determine whether or not the malfunction has occurred when:
a vehicle speed, which is a traveling speed of the vehicle, is equal to or higher than a reference vehicle speed;
the determined target current is an increase current to increase the relative position; and
the detection value is less than a reference value.

* * * * *